(12) United States Patent
Kobayashi

(10) Patent No.: US 7,623,536 B2
(45) Date of Patent: Nov. 24, 2009

(54) NETWORK RELAYING METHOD AND DEVICE

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 440 days.

(21) Appl. No.: 11/097,709

(22) Filed: Apr. 1, 2005

(65) Prior Publication Data

US 2005/0180448 A1 Aug. 18, 2005

Related U.S. Application Data

(63) Continuation of application No. PCT/JP02/11528, filed on Nov. 5, 2002.

(51) Int. Cl.
 *H04J 3/14* (2006.01)
(52) U.S. Cl. ....................... 370/412; 370/312
(58) Field of Classification Search ............... 370/312, 370/432, 390, 236, 251, 401, 412; 709/204, 709/238, 227; 713/153; 715/788
See application file for complete search history.

(56) References Cited

U.S. PATENT DOCUMENTS

| 5,608,726 | A | * | 3/1997 | Virgile | 370/401 |
|---|---|---|---|---|---|
| 6,501,763 | B1 | * | 12/2002 | Bhagavath et al. | 370/432 |
| 6,892,359 | B1 | * | 5/2005 | Nason et al. | 715/788 |
| 7,236,465 | B2 | * | 6/2007 | Banerjee et al. | 370/312 |
| 2001/0024446 | A1 | * | 9/2001 | Craig et al. | 370/412 |
| 2002/0120769 | A1 | * | 8/2002 | Ammitzboell | 709/238 |
| 2002/0143951 | A1 | * | 10/2002 | Khan et al. | 709/227 |
| 2002/0150094 | A1 | * | 10/2002 | Cheng et al. | 370/389 |
| 2003/0233540 | A1 | * | 12/2003 | Banerjee et al. | 713/153 |
| 2005/0091313 | A1 | * | 4/2005 | Zhou et al. | 709/204 |

FOREIGN PATENT DOCUMENTS

| JP | 6-252936 | 9/1994 |
|---|---|---|
| JP | 7-264243 | 10/1995 |
| JP | 10-285220 | 10/1998 |
| JP | 11-112499 | 4/1999 |
| JP | 11-298498 | 10/1999 |
| JP | 2000-78196 | 3/2000 |
| JP | 2002-44143 | 2/2002 |
| JP | 2002-64558 | 2/2002 |
| JP | 2002-111649 | 4/2002 |
| JP | 2002-185528 | 6/2002 |
| JP | 2002-217973 | 8/2002 |

OTHER PUBLICATIONS

Preliminary Report dated Sep. 9, 2008 from corresponding Japanese Application No. 2004-549557.
Notification of Reason(s) for Refusal dated Sep. 4, 2007, from the corresponding Japanese Application.

* cited by examiner

*Primary Examiner*—Kwang B Yao
*Assistant Examiner*—Syed Bokhari
(74) *Attorney, Agent, or Firm*—Katten Muchin Rosenman LLP

(57) ABSTRACT

In a network relaying method and device at a time of distributing data from a server to a client by multicast, join/leave information transmitted by the client to a multicast group is discriminated, the join/leave information of the client is processed into multicast join/leave notifying information and the multicast join/leave notifying information is transferred to the server.

16 Claims, 27 Drawing Sheets

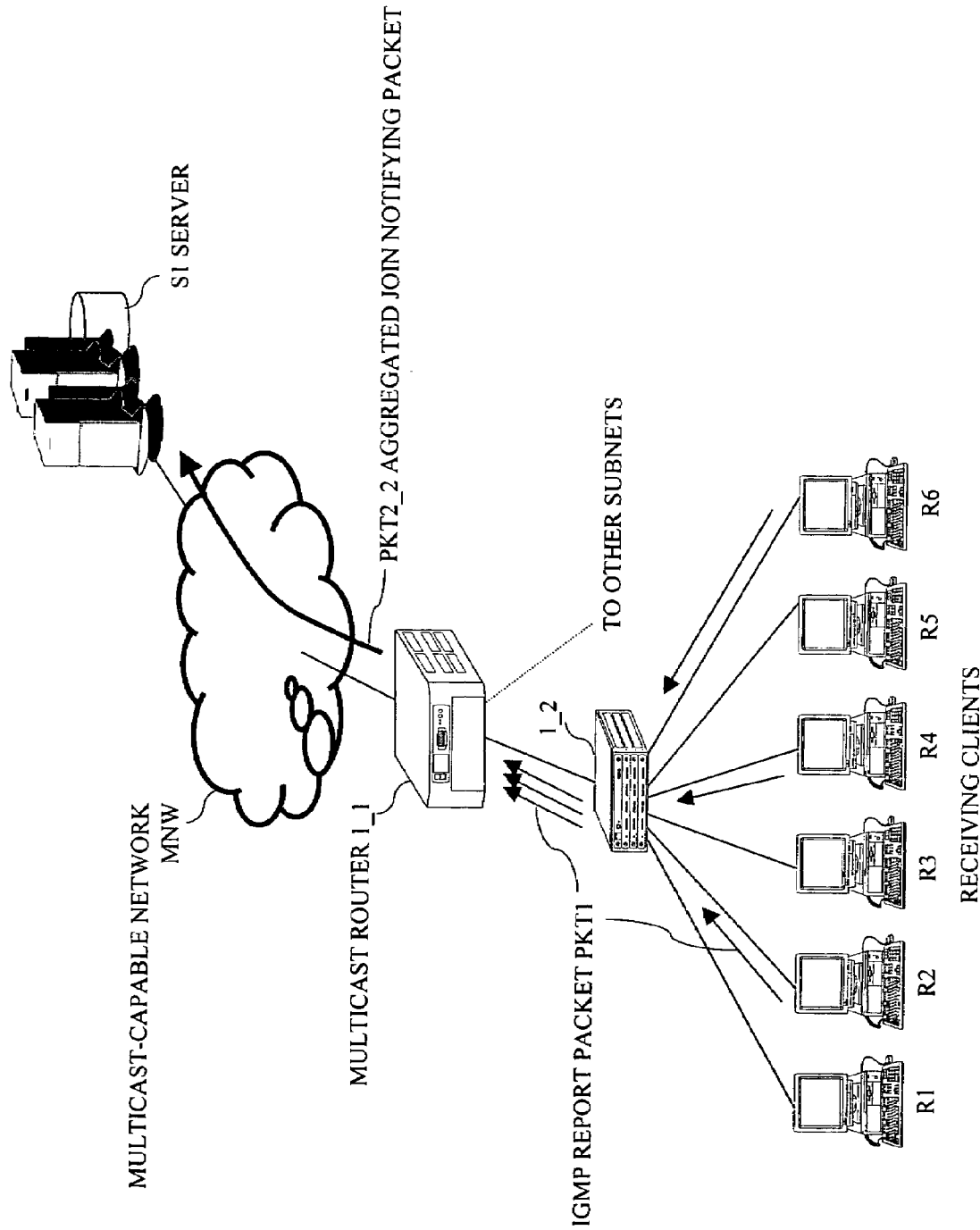

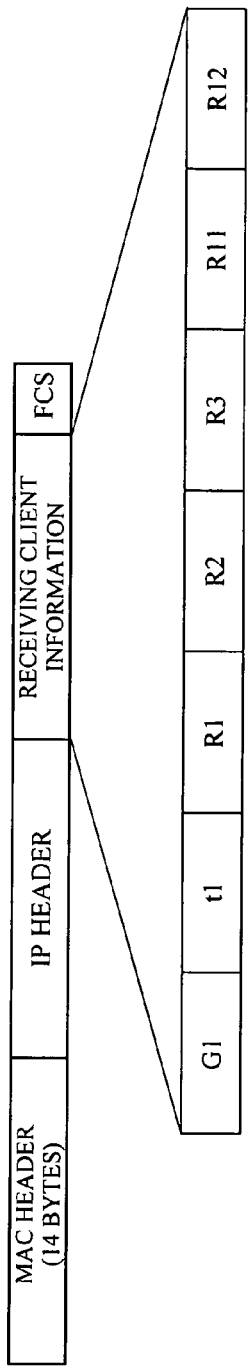

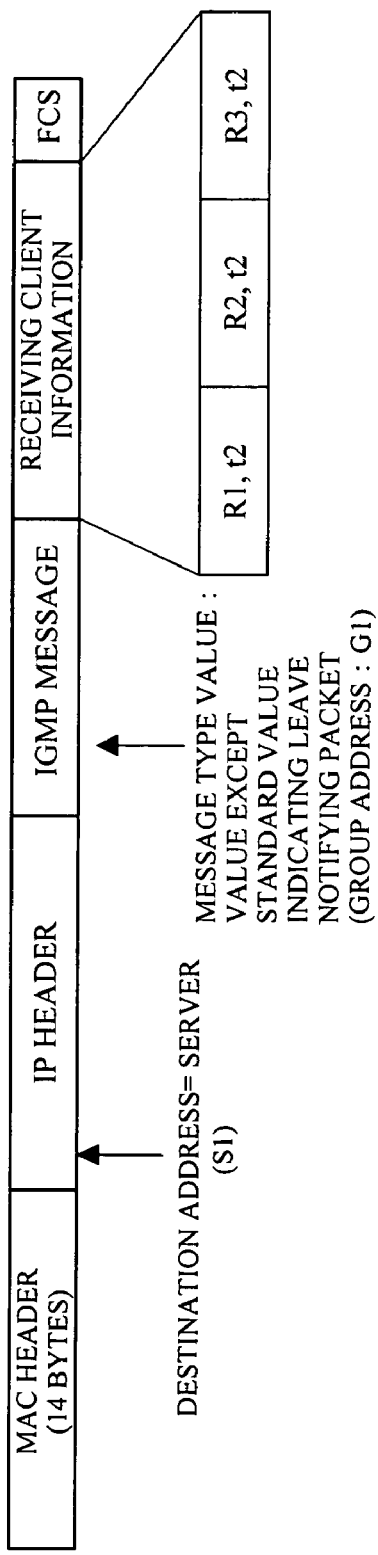

FIG.21

| MAC HEADER (14 BYTES) | IP HEADER | IGMP MESSAGE | RECEIVING CLIENT INFORMATION | FCS |
|---|---|---|---|---|

| R1, t1 | R2, t1 | R3, t1 | R11, t1 | R12, t1 |
|---|---|---|---|---|

FIG.22

| MULTICAST | CLIENT | JOIN TIME | LEAVE TIME | RECEPTION TIME | STATUS |
|---|---|---|---|---|---|
| G1 | R1 | t1 | t2 | t2-t1 | RECEPTION END |
|  | R2 | t1 | t2 | t2-t1 | RECEPTION END |
|  | R3 | t1 | t2 | t2-t1 | RECEPTION END |
|  | R11 | t1 | t2 | t2-t1 | RECEPTION END |
|  | R12 | t1 |  | — | RECEIVING |
| G2 | xx | tx |  | — | RECEIVING |
| : | yy | ty |  |  |  |

FIG.31

<ASSIGNMENT OF MULTICAST ADDRESS>

| CLASS D ADDRESS | USAGE |
|---|---|
| 224.0.0.0 | Reserved |
| 224.0.0.1~224.0.0.255<br>   224.0.0.1 - ALL-SYSTEMS<br>   224.0.0.2 - ALL-ROUTERS<br>   224.0.0.4 - DVMRP ROUTERS<br>   244.0.0.5 - OSFP-ALL<br>      : | ASSIGNMENT TO ROUTING PROTOCOL ETC. |
| 224.0.1.0~238.255.255.255<br>   224.0.1.7 - AUDIO NEWS<br>   224.0.1.11 - IETF MEETING VOICE<br>   224.0.1.12 - IETF MEETING VIDEO<br>   244.0.1.16 - MUSIC SERVICE<br>      : | ASSIGNMENT TO PUBLIC USE |
| 239.0.0.0~239.255.255.255 | ASSIGNMENT TO LOCAL SITE |

NETWORK RELAYING METHOD AND DEVICE

CROSS-REFERENCE TO RELATED APPLICATION

This application is a continuation of International Application PCT/JP02/11528 filed on Nov. 5, 2002, now pending, the contents of which are herein wholly incorporated by reference.

BACKGROUND OF THE INVENTION

1. Field of the Invention

The present invention relates to a network relaying method and device, and in particular to a network relaying method and device at the time of distributing data from a server to a client by multicast.

2. Description of the Related Art

Together with a recent rapid spread of a personal computer, an intranet has been expanding, while a computer and a network themselves have become advanced and sophisticated. Also, the spread of web pages (WWW) and multimedia data such as moving images and voices have been rapidly advanced.

Furthermore, the spread of a broadband network has been recently advanced in accesses over the Internet including enterprise users and general users. The use of the voices and the moving images so-called multimedia, and a business form by distributing and broadcasting services using the multimedia have been increasing.

Presently, in the course of spread, a method of distributing data to each user by a unicast technology has been used in many cases. Especially in the moving image distribution accessed by numerous users, a mechanism in which numerous servers are set in data distribution sources, or a cache server is provided in every area and the users receive data from an adjoining cache server is adopted for the purpose of load balancing.

This is applied to an on-demand broadcasting and a real-time broadcasting. In order to provide quality which satisfies numerous users, numerous facilities and a large amount of investment are required.

On the other hand, in order to efficiently transmit large amounts of data, a data transmission by a "multicast" technology has begun to be performed. It is expected that a multimedia data transmission using the multicast is spreading more and more.

While the multicast can not perform an on-demand distribution basically, it has numerous merits in a real-time moving image distribution and voice distribution such as live broadcasting.

Namely, in the multicast distribution, as shown in FIG. 1, a server S1 can make numerous clients R1, R2, . . . receive data through multicast routers 1_1 and 1_2 (hereinafter, occasionally represented by a reference numeral "1") and LAN switches SW1, SW2 (hereinafter, occasionally represented by a reference numeral "SW") only by transmitting a single stream to a multicast-capable network MNW, regardless of the number of users (clients) who receive the data.

Accordingly, it is not necessary to provide a cache in each location, and a bandwidth in each network can be saved different from the unicast.

Put another way, a traffic amount of a certain path can be kept fixed regardless of the number of users, little influence is exerted on other communications, and facilities such as a network and a cache server specific to a distribution are not required different from the case of the unicast, so that it becomes possible to distribute the multimedia data very inexpensively.

There is a restriction that an entire network ranging from the server to the client is required to support the multicast. However, presently, the support for the multicast has almost been completed in a relaying device and a data distribution server set on the network, or all of the personal computers used by clients. It is expected that the ratio of the multicast usage becomes gradually higher especially in the moving image distribution and the voice distribution in a real-time broadcasting form.

Hereinafter, a summary of an environment and a mechanism of the multicast data distribution will be described.

Specifically, an IP multicast address (group address), a multicast address of a data link layer, an IGMP (Internet Group Management Protocol) that is a protocol between a client (host) and a multicast router, and a multicast routing protocol constructing a multicast distribution tree within the network will now be described respectively. It is to be noted that the data link layer will be described for an Ethernet.

An IP multicast distribution uses the multicast address, functions between clients R1, R2 and a multicast router 1 as shown in FIGS. 28A and 28B, and is realized by operating the IGMP, which provides a function that the router 1 grasps the multicast group of the subordinate clients R1 and R2 and the multicast routing protocol which constructs a multicast data distribution tree from the server to a plurality of receiving clients between routers.

The IGMP is a protocol with which the router 1 grasps/manages whether or not a receiving client exists in a local network to which the router itself belongs by transferring an IGMP message of a packet format shown in FIG. 29 between the clients R1, R2 and the router 1.

Put another way, the IGMP is a protocol between the router and the client for informing the router 1 that the clients R1 and R2 join a certain multicast group. Both of the router and the clients are required to mount a function specified by the IGMP (applied when a "protocol ID" in an IP header shown in FIG. 30 is "2"). An IGMPv1 is specified in an appendix 1 of RFC 1112, an IGMPv2 is specified in RFC 2236, and an IGMPv3 is being standardized in IETF.

The multicast routing protocol is a protocol between routers for a path control (or arrangement of a path tree) determining to which interface of the router 1 multicast data are copied in order for the router 1 to distribute a multicast data stream to the receiving clients R1 and R2 in a network composed of a plurality of multicast routers 1 and the layer 3 switches SW as shown in FIG. 1.

As for its type, there are DVMRP (used in MBone, specified in RFC 1075), PIM (specified in RFC 2117; new version IETF is being reviewed), MOSPF (operable only on OSFP, specified in RFC 1584 and 1585), and the like.

It is to be noted that the above-mentioned RFC 1112 has a function of mapping between an IP address of a class D, i.e. a multicast IP address and a multicast physical address, and a filtering function of receiving only a packet of a specific multicast physical address and of transferring the packet to an upper layer.

A correspondence between the multicast IP address and the multicast physical address is specified (in RFC 1700) to put lower 23 bits of the multicast IP address into the lower 23 bits of the multicast physical address "01.00.5E.00.00.00$_{16}$". For example, the multicast IP address "239.133.130.34" is the multicast physical address "01:00:5E:05:82:22".

Also, the multicast address (IPv4) is specified as a class D address, in a range from "224.0.0.0" to "239.259.255.255" by a decimal notation.

FIG. 31 shows the IP address of the class D. The class D address is identified with the first 4 bits "1110". As shown in FIG. 31, some multicast addresses are reserved for specific usages.

Addresses assigned to local sites, i.e. from "239.0.0.0" to "239.255.255.255" are IP multicast addresses generally used by e.g. an enterprise network, an ISP, and the like.

A distribution procedure of the above-mentioned multicast data will now be simply described by referring to FIGS. 28A and 28B.

[1] Join to Multicast Group (1) In order to query the clients R1 and R2 connected to the local network as to a join to a multicast group, the multicast router 1 periodically transmits to "224.0.0.1" (All-Systems-Group) an "HMQ (Host Membership Query)" message (see ① in FIG. 28A) in which a type value is "0x11" within an IGMP header of a packet in a format (IGMPv2) shown in FIG. 29.

(2) A client which desires the join to the multicast group responds to the above-mentioned "HMQ". In order to inform the multicast address of a group which the client desires to join, the client transmits an "HMR (Host Membership Report)" message (see ② in FIG. 28A) whose type value is "0x12" within the IGMP header of the packet in the same format to the multicast address which the client joins.

Receiving this message, the multicast router 1 grasps the multicast group (identified by the above-mentioned class D address) which the client joins, and starts the transmission of multicast data (stream) to the local network.

[2] Multicast Data Distribution (1) On the other hand, a transmitting server such as the server S1 in FIG. 1 of the multicast data transmits "single" data (stream) to the multicast group identified with the class D address.

(2) The multicast router 1 within the network copies the data stream addressed to the group as required to be transmitted along the path to each receiving client which joins the multicast group.

Put another way, the multicast data are distributed along the path tree, formed by a multicast routing protocol, of the multicast data distribution from the transmitting server to each receiving client. Finally, the "single" data stream transmitted by the server is distributed to "a plurality of" clients within the network.

[3] Leave from Multicast Group (1) A client which desires to leave the multicast group, which the client has joined, transmits a "leave" message (see (I in FIG. 28B) as shown in FIG. 28B to "224.0.0.2" (All-Routers-Group) at the time of determining the leave.

(2) In order to confirm that there is no other client which has joined the multicast group, the multicast router 1 having received the "leave" message transmits a "GS-Q (Group Specific Query)" message (see ④ in FIG. 28B) by designating the group address.

If there is another client which has joined the group except the client which has transmitted the "leave" message in this case, the other client transmits the "HMR" message to inform its existence to the multicast router 1.

While there are numerous merits in the data and contents distribution using the multicast, the management of an individual user is difficult since a server does not transmit data to each client different from the case of the unicast, and the multicast itself uses a UDP (User Data Protocol) packet.

The difficulty of the management means that it is impossible to grasp e.g. the number of receiving clients at a certain time, and how long (from when until when) each client has received data, and to acquire and manage information of the client itself.

Accordingly, it has been impossible to collect information for reviewing which content is popular and how many clients have received the content, and to realize charging in accordance with a time of a data reception as a service form.

SUMMARY OF THE INVENTION

It is accordingly an object of the present invention to realize a network relaying method and device managing individual information of a client which joins/leaves multicast at the time of distributing data from a server to a client by multicast.

In order to achieve the above-mentioned object, a network relaying method according to the present invention comprises: a first step of discriminating join/leave information transmitted by a client to a multicast group; a second step of processing the join/leave information of the client into multicast join/leave notifying information; and a third step of transferring the multicast join/leave notifying information to a server.

The above-mentioned multicast join/leave notifying information may include identifying information of the client, a multicast address and a join/leave starting time.

Also, the above-mentioned first step may discriminate the join/leave information of the client mounted on a multicast control packet from the client, the second step may process the join/leave information of the client into the multicast join/leave notifying packet and the third step may transfer the multicast join/leave notifying packet to the server.

Also, when transferring the multicast join/leave notifying packet to the server and receiving join/leave information for a same multicast group from another client within a fixed time, the above-mentioned second step may generate an aggregated join/leave notifying packet in which the join/leave information for all of the clients is aggregated in a single packet and the third step may transfer the aggregated join/leave notifying packet to the server.

Furthermore, when the first step discriminates a reception of the multicast join/leave notifying packet from a downstream network device, the above-mentioned third step may further transfer the multicast join/leave notifying packet to the server.

Furthermore, when the first step discriminates a reception of the aggregated join/leave notifying packet from a downstream network device, the third step may further transfer the aggregated join/leave notifying packet to the server.

Furthermore, when the first step discriminates a reception of the aggregated join/leave notifying packet from a downstream network device, the above-mentioned second step may generate, when the join/leave information for a same multicast group from the client itself is aggregated, an aggregated join/leave notifying packet in which all of join/leave information is aggregated in a single packet and the third step may immediately transfer the aggregated join/leave notifying packet to the server.

Furthermore, the above-mentioned third step may hold the join/leave information of the client until a transfer is requested from the server.

Furthermore, a transmitting source address included in a packet may be used as identifying information of the above-mentioned client.

Furthermore, when the client does not respond to a periodical query, the third step may transmit leave notifying information of the client to the server.

Furthermore, a network relaying device for realizing the network relaying method according to the present invention comprises: a discriminating portion for discriminating join/leave information transmitted by a client to a multicast group; an information processing portion for processing the join/leave information of the client into multicast join/leave notifying information; and a transfer processor for transferring the multicast join/leave notifying information to a server.

Also, the above-mentioned multicast join/leave notifying information may include identifying information of the client, a multicast address and a join/leave starting time.

Also, the above-mentioned discriminating portion may discriminate the join/leave information of the client mounted on a multicast control packet from the client, the information processing portion may process the join/leave information of the client into the multicast join/leave notifying packet and the transfer processor may transfer the multicast join/leave notifying packet to the server.

Also, when transferring the multicast join/leave notifying packet to the server and receiving join/leave information for a same multicast group from another client within a fixed time, the above-mentioned information processing portion may generate an aggregated join/leave notifying packet in which the join/leave information for all of the clients is aggregated in a single packet and the transfer processor may transfer the aggregated join/leave notifying packet to the server.

Also, when the discriminating portion discriminates a reception of the multicast join/leave notifying packet from a downstream network device, the above-mentioned transfer processor may further transfer the multicast join/leave notifying packet to the server.

Also, when the discriminating portion discriminates a reception of the aggregated join/leave notifying packet from a downstream network device, the above-mentioned transfer processor may further transfer the aggregated join/leave notifying packet to the server.

Furthermore, when the above-mentioned discriminating portion discriminate a reception of the aggregated join/leave notifying packet from a downstream network device, the above-mentioned information processing portion may generate, when the join/leave information for a same multicast group from the client itself is aggregated, an aggregated join/leave notifying packet in which all of join/leave information is aggregated in a single packet and the transfer processor may immediately transfer the aggregated join/leave notifying packet to the server.

Also, the above-mentioned transfer processor may hold the join/leave information of the client until a transfer is requested from the server.

A transmitting source address included in a packet may be used as identifying information of the above-mentioned client.

Furthermore, when the client does not respond to a periodical query, the above-mentioned transfer processor may transmit leave notifying information of the client to the server.

Furthermore, a server may comprise: a discriminating portion for discriminating multicast join/leave notifying information transmitted from the above-mentioned network relay; and a holding portion for extracting information of the client in the multicast join/leave notifying information to be held.

The server may further comprise means charging by the hour a multicast data distribution (content reception) based on the client information.

The network relaying method and device according to the present invention as mentioned above will now be described referring to attached figures.

FIG. 1 shows a network arrangement for illustrating a concept of the present invention. In FIG. 1, S1 denotes a transmitting server of multicast data, 1_1 and 1_2 denote multicast (-capable) routers in which the network relaying method and device of the present invention are mounted, SW1 and SW2 denote LAN switches or layer 2 switches accommodating clients, MNW denotes a network composed of the multicast routers, R1 denotes a client which receives normal data, R2 denotes a client which receives multicast data, PKT1 denotes a multicast control packet which functions between the receiving clients R1, R2 and the multicast router 1_2, and PKT2 denotes a user information packet including join or leave (hereinafter, referred to as join/leave) information of the receiving clients and being transferred to the server S1. It is to be noted that the packets PKT1 and PKT2 are occasionally represented by a reference numeral PKT.

FIG. 2 shows a diagram of a principle arrangement of a network relaying device 1 of the present invention which is a router in which a normal multicast function is mounted. The network relaying device 1 is composed of transmitting/receiving interfaces 2, 7 and 8, a discriminating portion 3 of the multicast control packet PKT1, a generator 4 of a client management information packet PKT2 for notifying the user information to the server S1, and a transfer processor 5 which includes a routing table 6 and which performs routing processing (including multicast routing processing) or the like mounted on the normal network relay.

In operation, when the receiving client R2 is connected to the transmitting/receiving interface 2 through the LAN switch SW2, the multicast control packet PKT1 for notifying the multicast router 1 that the receiving client desires to receive the multicast data (desires to join multicast group) or stops receiving the multicast data although the data having been received (desires to leave multicast group) is transmitted from the receiving client R2, and the multicast router 1 receives this packet.

The multicast router 1 examines what the received packet is by the packet discriminating portion 3. If the packet is a multicast control packet PKT1, it is transferred to the transfer processor 5 for performing a normal multicast data transfer control, so that the information is reflected on the routing table 6.

At the same time, in order to manage the user information in the server S1, the packet generator 4 generates the multicast join/leave notifying packet storing the user information to be transferred to the transfer processor 5, so that it is transferred from an interface 7 or 8 in the direction where the server S1 exists.

The packet reaches the server S1, thereby enabling a reception user management of data which has been difficult by the prior art multicast data transfer to be realized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 8 is a diagram showing a network example at the time of aggregating client information;

FIG. 15 is a format diagram of a multicast (aggregated) join notifying packet identified with a protocol ID field;

FIG. 16 is a format diagram showing an IP header in FIG. 15;

FIG. 19 is a format diagram of a multicast aggregated leave notifying packet;

FIG. 20 is a diagram of a receiving client management table managed by a server at the time of leaving multicast aggregation;

FIG. 21 is a format diagram of a multicast aggregated leave notifying packet to which information is added on the way to a server;

FIG. 22 is a diagram of a receiving client management table managed by the server concerning FIG. 21;

FIG. 31 is a diagram illustrating an assignment according to a usage purpose of a multicast address.

DESCRIPTION OF THE EMBODIMENTS

Hereinafter, embodiments of a network relaying method and device according to the present invention will be described. As for a multicast control message, the above-mentioned IGMPv2 (specified in RFC 2236) message which has the most widely spread and has been mounted will now be described. However, the present invention can be also applied to a case where the multicast control message is of the IGMPv1 or IGMPv3.

Also, in the case of IPv6, the function corresponding to the IGMPv2 is called an MLD (Multicast Listener Discovery), and specified in RFC 2710. Also, the function corresponding to the IGMPv3 is being standardized by IETF. While the case where the network layer is of IPv4 will, be described in this embodiment, this embodiment can be also applied to the case of the IPv6, as a matter of course. The difference between the IPv6 multicast and the IPv4 multicast will be described later.

Figure 3:
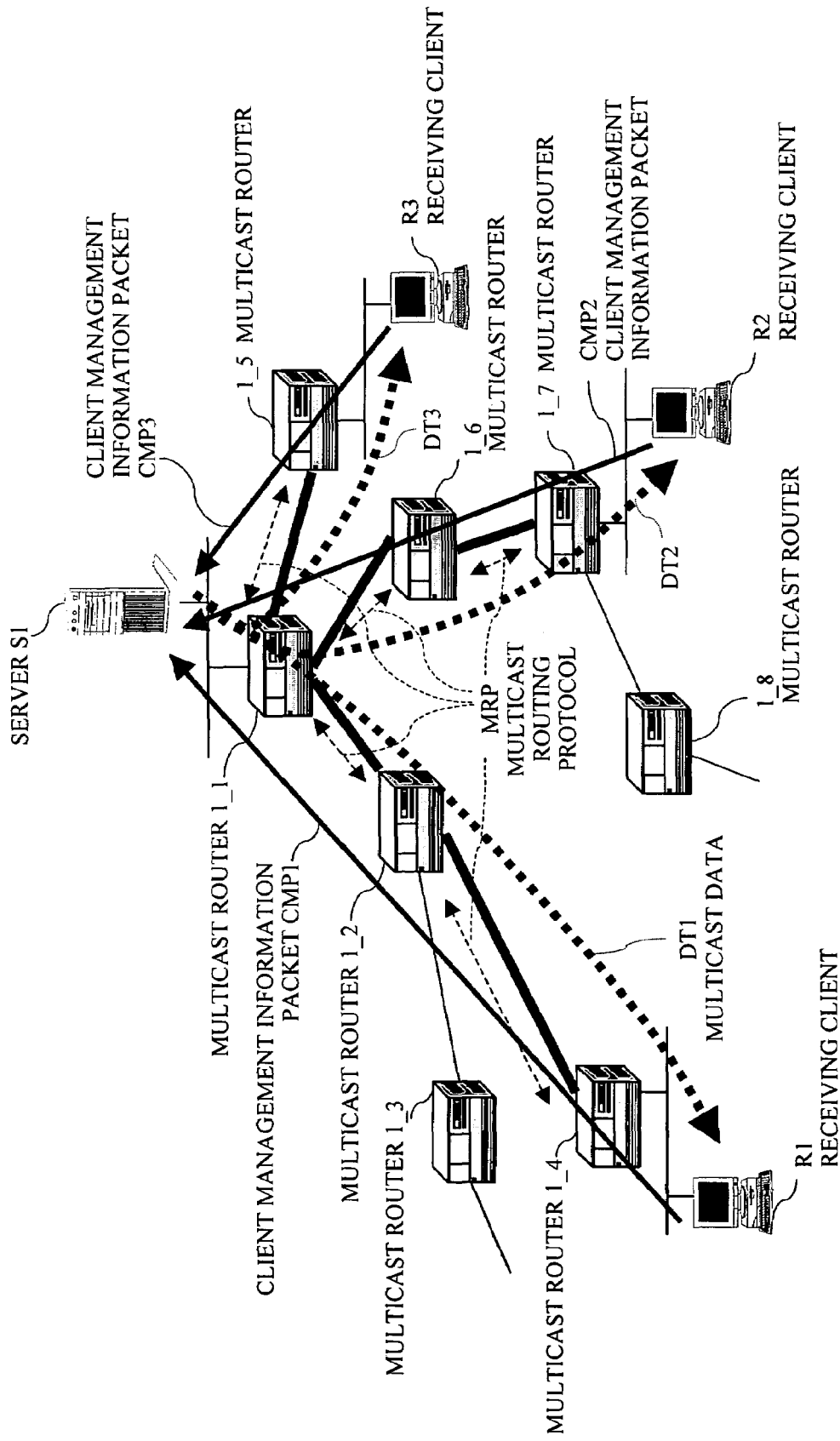
FIG. 3 is a diagram showing a network arrangement for illustrating an embodiment of the present invention.

FIG. 3 shows a general IP network such as an enterprise IP network, an IP network of an ISP (Internet Service Provider) and a carrier which are targets of the present invention. In the same way as FIG. 1, the IP network is composed of clients R1-R3 such as personal computers, multicast-capable routers 1_1-1_8 (hereinafter, occasionally represented by a reference numeral "1") which compose a network, a server S1 which distributes and manages multicast data by a multicast routing protocol MRP and the like.

Figure 1:
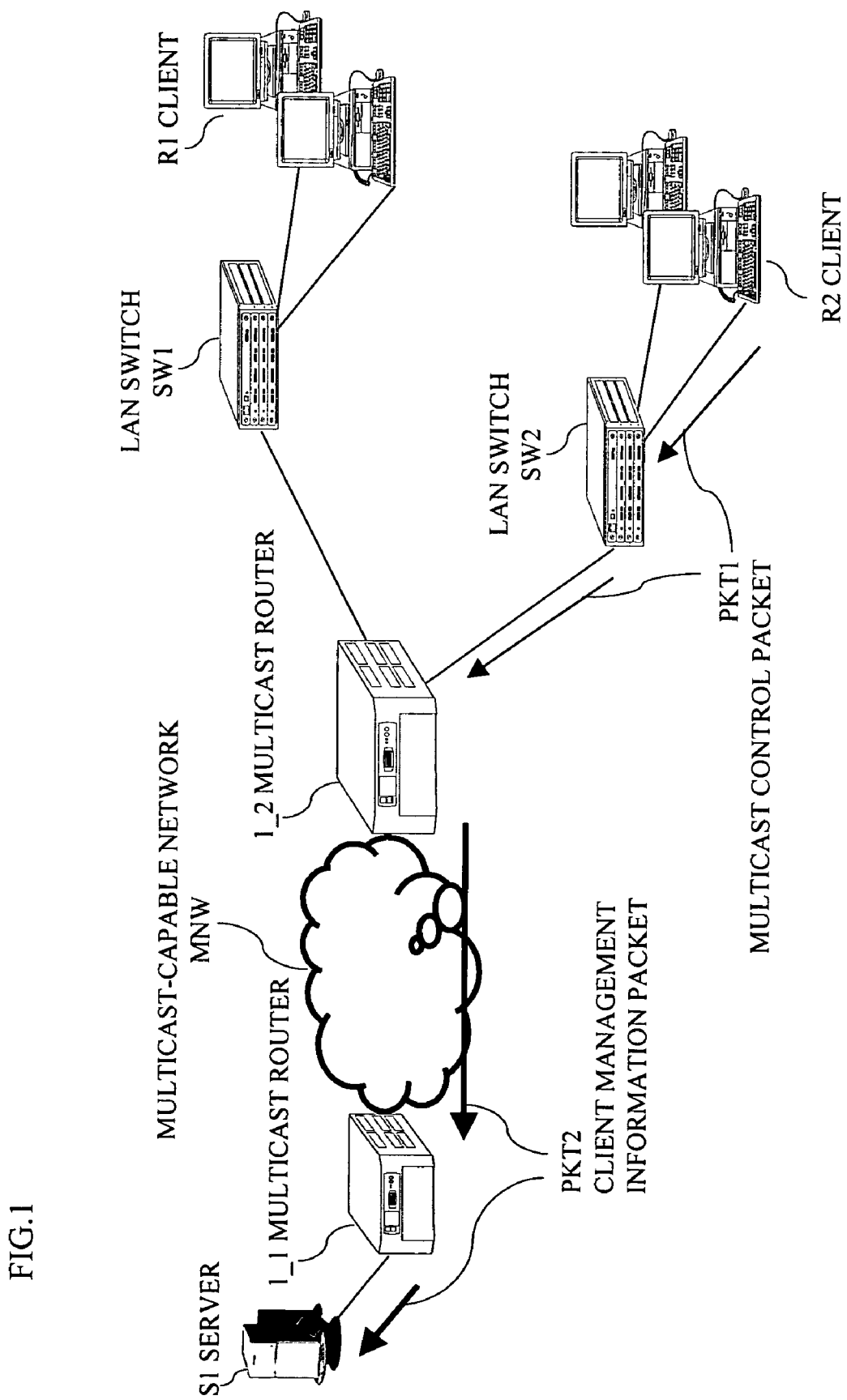
FIG. 1 is a diagram showing a network arrangement for illustrating a network relaying method and device according to the present invention.

Also, as shown in FIG. 1, a form in which the clients R1-R3 are accommodated in the LAN switch/layer 2 switch to be connected to the multicast router 1 is general in an enterprise and accesses over the Internet. However, this form is not shown for simplifying the figure. It is to be noted that client management information packets CMP1-CMP3 in FIG. 3 are respectively composed of the packets PKT1 and PKT2 of FIG. 1.

Embodiment [1]

Figure 4:
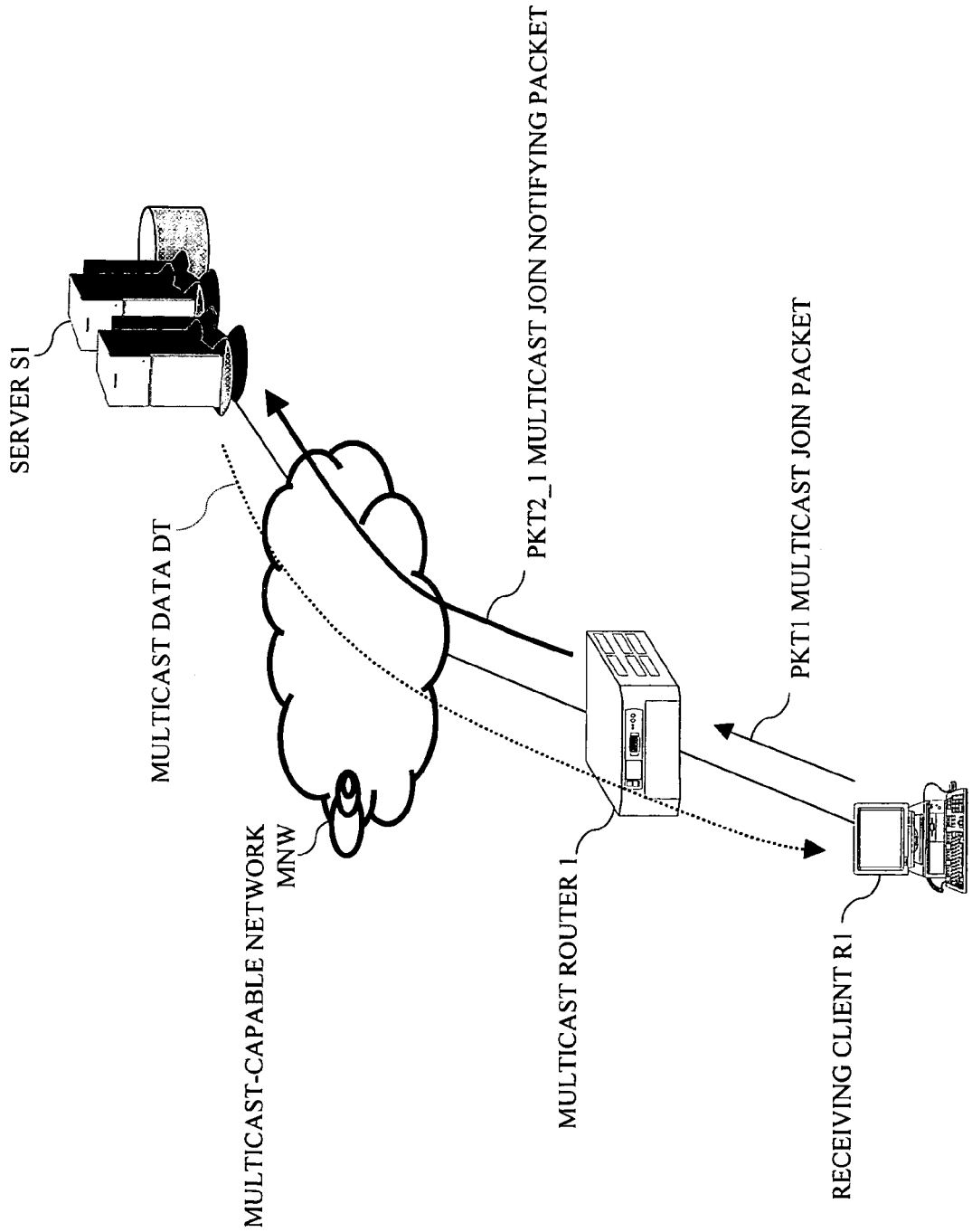
FIG. 4 is a diagram showing a simplified network arrangement of the network arrangement of FIG. 3.

FIG. 4 shows a simplified embodiment [1] of the present invention in the network arrangement of FIG. 3. FIG. 4 shows a state where the multicast join packet PKT1 is transmitted to the multicast router 1 from the client R1, a multicast join notifying packet PKT2_1 is transmitted from the multicast router 1 to the server S1 in response to the packet PKT1, and a state where the server S1 transmits multicast data DT.

Figure 29:
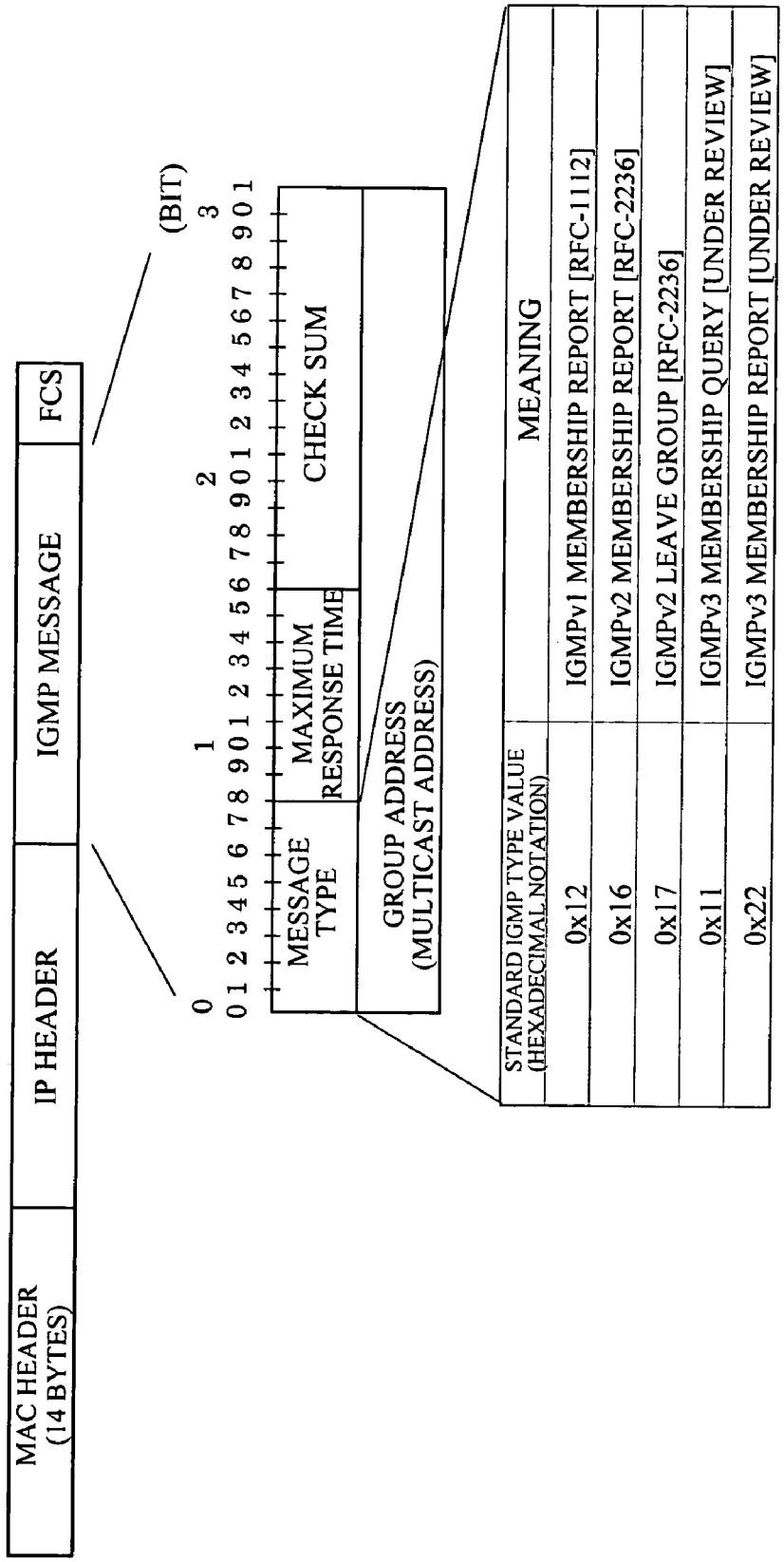
FIG. 29 is a general format diagram of an IGMPv2 packet.
Figure 30:
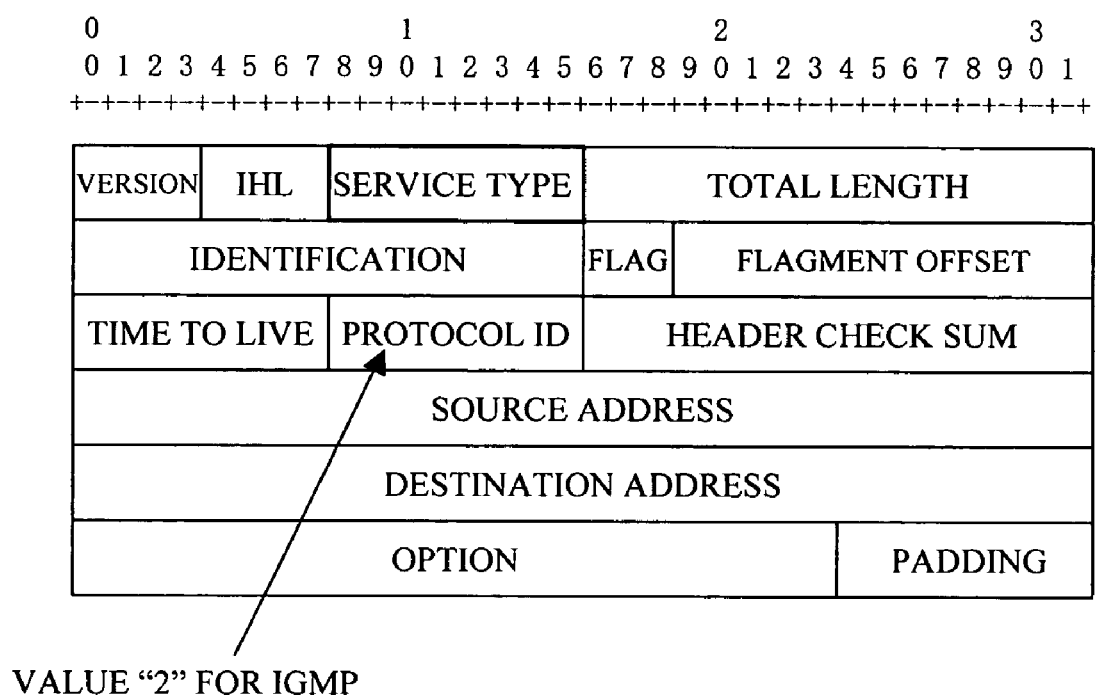
FIG. 30 is a general format diagram of an IPv4 header.

It is to be noted that the IGMP packet format and the IGMP message field are the same as those shown in FIG. 29, and the IPv4 header shown in FIG. 30 may be used for the IPv4 header.

Figure 2:
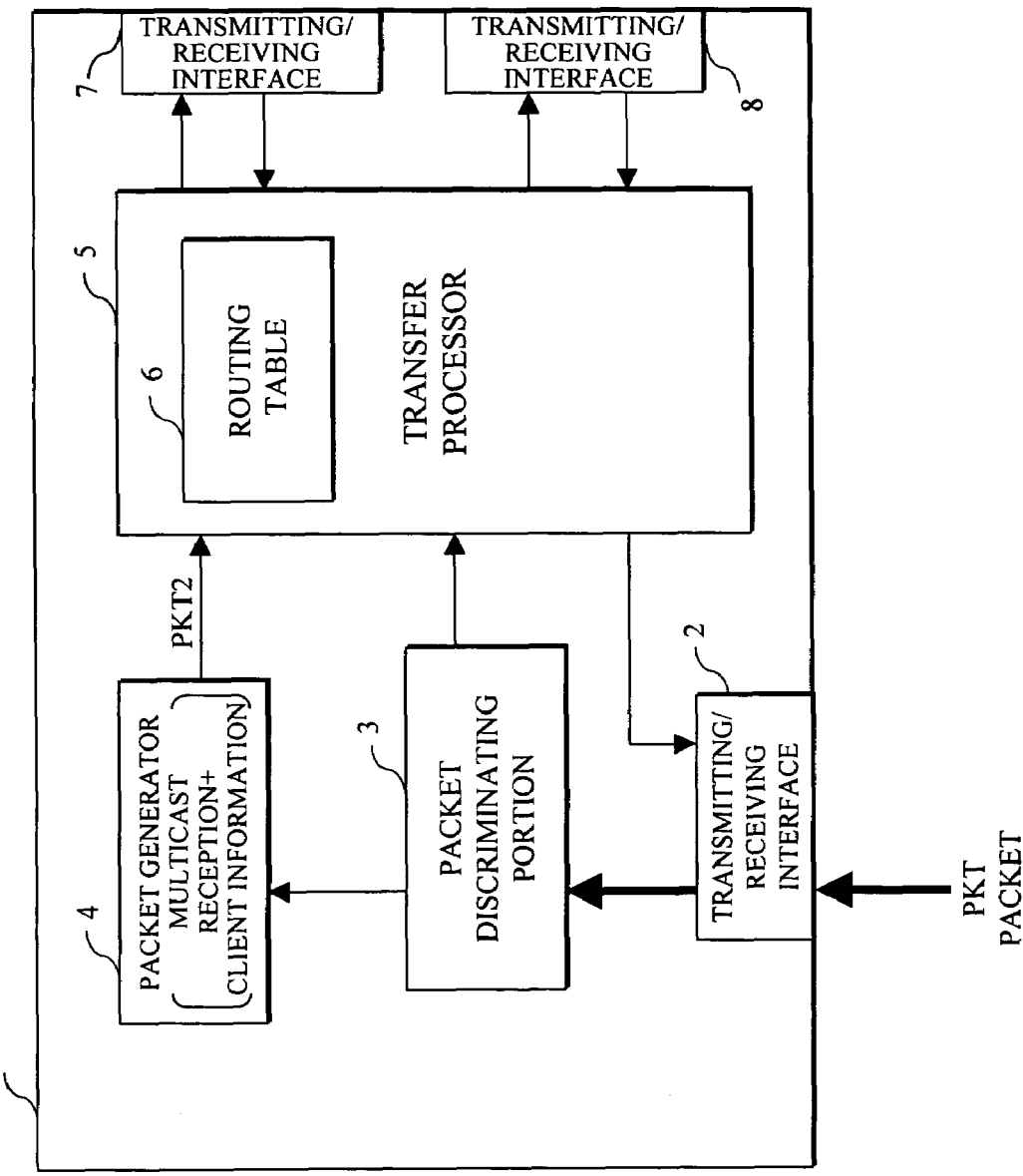
FIG. 2 is a block diagram of a principle arrangement of a network relaying device according to the present invention.
Figure 5:
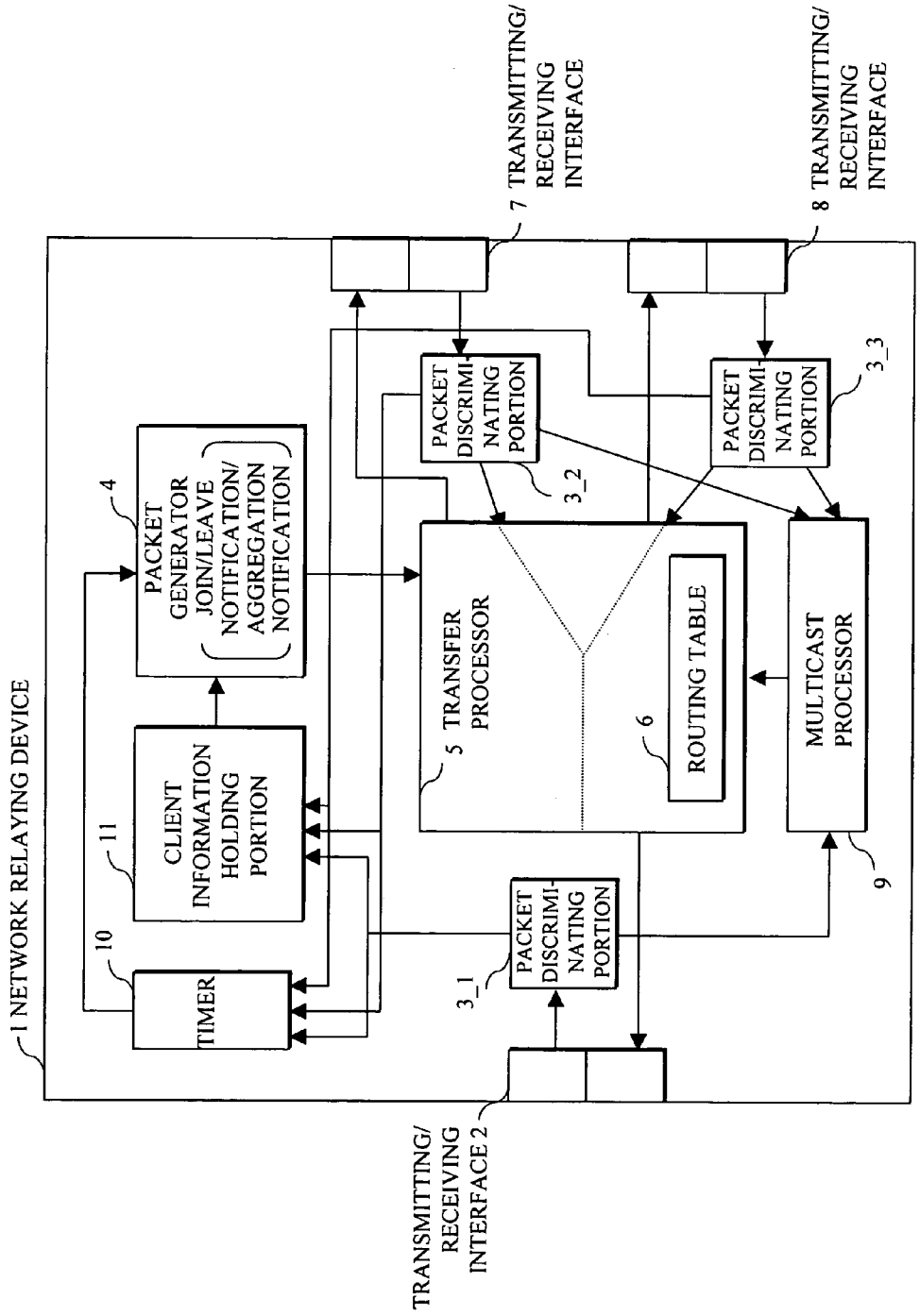
FIG. 5 is a block diagram showing an arrangement of an embodiment of a network relaying device according to the present invention.

Also, FIG. 5 shows an arrangement of an embodiment such as a multicast router, a multicast-capable layer 3 switch of the network relay, whose principle is shown in FIG. 2, according to the present invention.

In FIG. 5, packet discriminating portions 3_1-3_3 (hereinafter, occasionally represented by a reference numeral "3") detect a multicast join desiring message (IGMP Report) and a leave desiring message (IGMP Leave message) from a client to be transmitted to not only a multicast processor 9 which performs a known multicast control but also a timer 10 and a client information holding portion 11.

The timer 10 is used when a join/leave information notifying message (packet) in which client information is aggregated is generated together with the client information holding portion 11 and the packet generator 4 described later.

Hereinafter, operation of the network relaying device 1 shown in FIG. 5 will be described referring to FIGS. 3 and 4.

Firstly, the network relaying device 1 grasps the information of the receiving clients R1-R3 of the multicast data existing in the subordinate of its own interfaces 2, 7, and 8. Specifically, the packets transmitted from the clients R1-R3 desiring the reception of the multicast data are examined by the packet discriminating portion 3. If the packets include the IGMP reports (join desiring messages), it is recognized that the receiving client exists in the subordinate of the receiving interface.

As for the identification method of the IGMP report, ① an IP address is a multicast address, the ② "protocol No." within the IP header is "2" indicating the IGMP, and ③ the type value of the IGMP message is "0x16" are firstly confirmed.

As shown in FIG. 29, the multicast address (group address) which the receiving clients R1-R3 desire to receive is stored in the IGMP report.

The network relaying device 1 generates the multicast join notifying packet PKT2_1 with the destination address (see FIG. 30) as an address of the server S1 at the packet generator 4 so that the server S1 may manage that the client of transmitting source of the message desires to receive the multicast data (desire to join multicast). Then, the transfer processor 5 transfers the multicast join notifying packet PKT2_1 to the server S1 by normal routing processing.

At this time, the type value of the IGMP message is changed to be transmitted so that the server S1 may identify the multicast join notifying message when the server S1 receives the packet.

Namely, as for the type value of the IGMP message determined by the standard, as shown in FIG. 29, there are a version 1 (IGMPv1), a version 2 (IGMPv2) and a version 3 (IGMPv3) (being standardized by IETF (Internet Engineering Task Force) which is a standardization group of the Internet technology). However, in the present invention, the type value except the above-mentioned type values is set to the multicast join notifying message to be identified. This type value will be described later.

The IGMP report indicating that the clients R1-R3 desire to receive multicast data DT1-DT3 is transmitted to an address which the clients R1-R3 desire to receive (in the IGMPv3 under review, it is transmitted to "224.0.0.22"). In order to enable the server S1 to manage the information of the receiving clients of the multicast data DT1-DT3, the network relaying device 1, when receiving the IGMP report, replaces its destination address field by the server address to be transmitted to the server S1.

Since the "maximum response time field" within the IGMP message shown in FIG. 29 is not necessary for processing at this time, a method of setting "0" or the like is considered. Also, it is desirable to set a new calculated value to a "check sum" for integrity of the data.

A multicast address G1 which the client desires to receive is included in the group address. Thus, when e.g. the same client desires to receive a plurality of different multicast addresses, the addresses can be independently managed.

Figure 6:
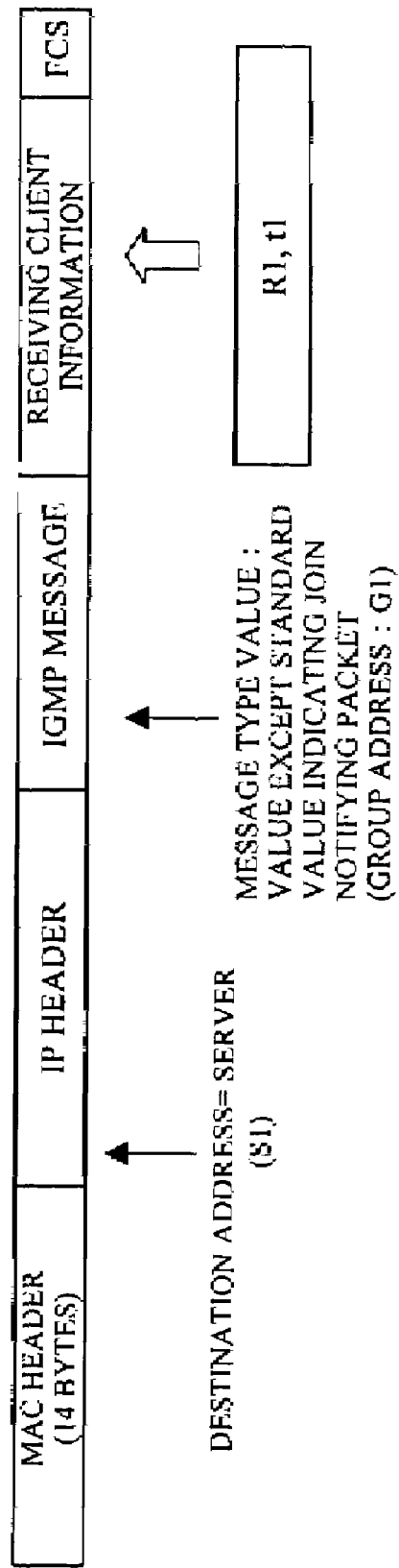
FIG. 6 is a format diagram of a multicast join notifying packet.

FIG. 6 shows a format of the multicast join notifying packet PKT2_1 transmitted from the network relaying device 1 to the server S1 as mentioned above. On the receiving client information, the address of the client R1 desiring the multicast join and a join starting time t1 are mounted.

The server S1 having received this packet confirms the message type. When it is the join notifying message, the address of the client R1 stored in the source address field (see FIG. 30) is associated with the address G1 of the multicast data transmitted by the server S1 and the reception time t1 of the join notifying packet to be stored. Thus, the client R1 can manage which multicast data (G1 in this example) has been received and when (t1 in this example) the data reception has started.

At this time, the network relaying device 1 accommodating the receiving client R1 in its own interface can not recognize the multicast address G1 and the address of the server S1 until the multicast data are received.

Therefore, if dummy multicast data with less traffic amount are flowed before the transmission of the actual multicast contents in an actual operation, the network relaying device 1 can recognize the relationship between the multicast address G1 and its server S1, and can grasp the relationship between G1 and S1 when the IGMP report is received from the client R1, so that the information R1 and G1 can be transmitted to the server S1.

As a matter of course, the session of the multicast is distinguished by the multicast address. Therefore, if the IGMP report for e.g. a multicast address G2 except G1 is received, the processing is performed to G2 in parallel with G1.

Figures 7A, 7B:
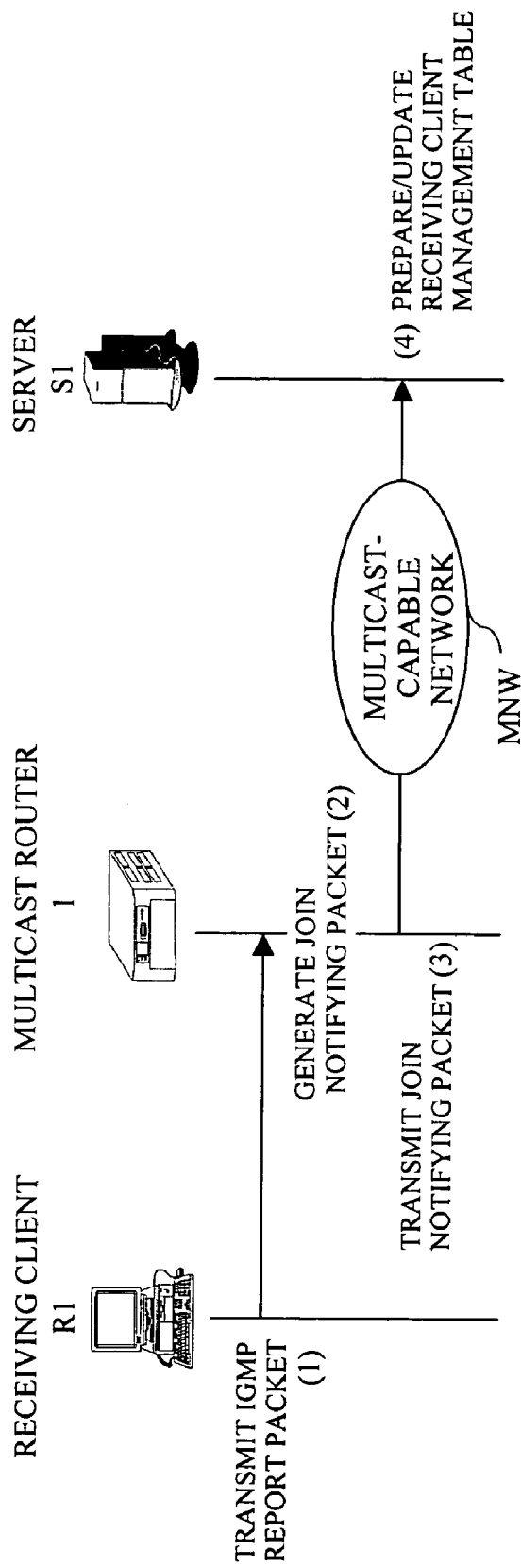
FIGS. 7A and 7B are diagrams showing a multicast join notifying sequence to a server and a receiving client management table managed by the server.

FIG. 7A shows the above-mentioned operation sequence. When the IGMP report packet PKT1 is transmitted from the client R1 (see (1) in FIG. 7A), the multicast router 1 having received the packet PKT1 generates the multicast join notifying packet PKT2_1 (see (2) in FIG. 7A). The packet PKT2_1 is further transmitted to the server S1 through the multicast-capable network MNW (see (3) in FIG. 7A), and a table for managing clients is prepared at the server S1 (see (4) in FIG. 7A).

FIG. 7B shows an example of the table at this time.

Embodiment [2]

The network relaying device usually has a plurality of interfaces 2, 8 and 7 as shown in FIG. 5. The subnet is connected to each of the interfaces as shown in FIG. 8, and numerous clients are connected to each subnet. When the object network scale is large, numerous join notifying messages PKT2 are to be transmitted to the server S1, which makes no problem if transmitted in a distributed manner, but which imposes processing load on the server S1 if transmitted in a concentrated manner.

Therefore, it is desirable that each network relaying device 1 collects the information of the subordinate receiving clients and information of a plurality of clients is included in a single packet to be transmitted collectively.

For example, when the network relaying device 1 receives a reception request control message, i.e. the IGMP report for the multicast address G1, the timer 10 is operated.

Figure 9:
FIG. 9 is a format diagram of a multicast aggregated join notifying packet.

The information of all of the IGMP reports addressed to the same (multicast) group address and received before the timer 10 expires, i.e. the source addresses of the receiving clients are included in the client information of a single packet as shown in a packet format of FIG. 9 and the packet is transmitted to the server as an aggregated join notifying message PKT2_2.

As for a determination method of a timer value, when e.g. a server or an administrator who transmits multicast data or the like desires to manage information per minute for the purpose of charging, the timer value may be set with 60 sec.

Also at this time, in order to indicate that this message is different from a normal IGMP report and the above-mentioned join notifying message, a type value not specified in the type field of the IGMP report in conformity with the standard and different from the type value of the above-mentioned join notifying message is used.

Figure 10:
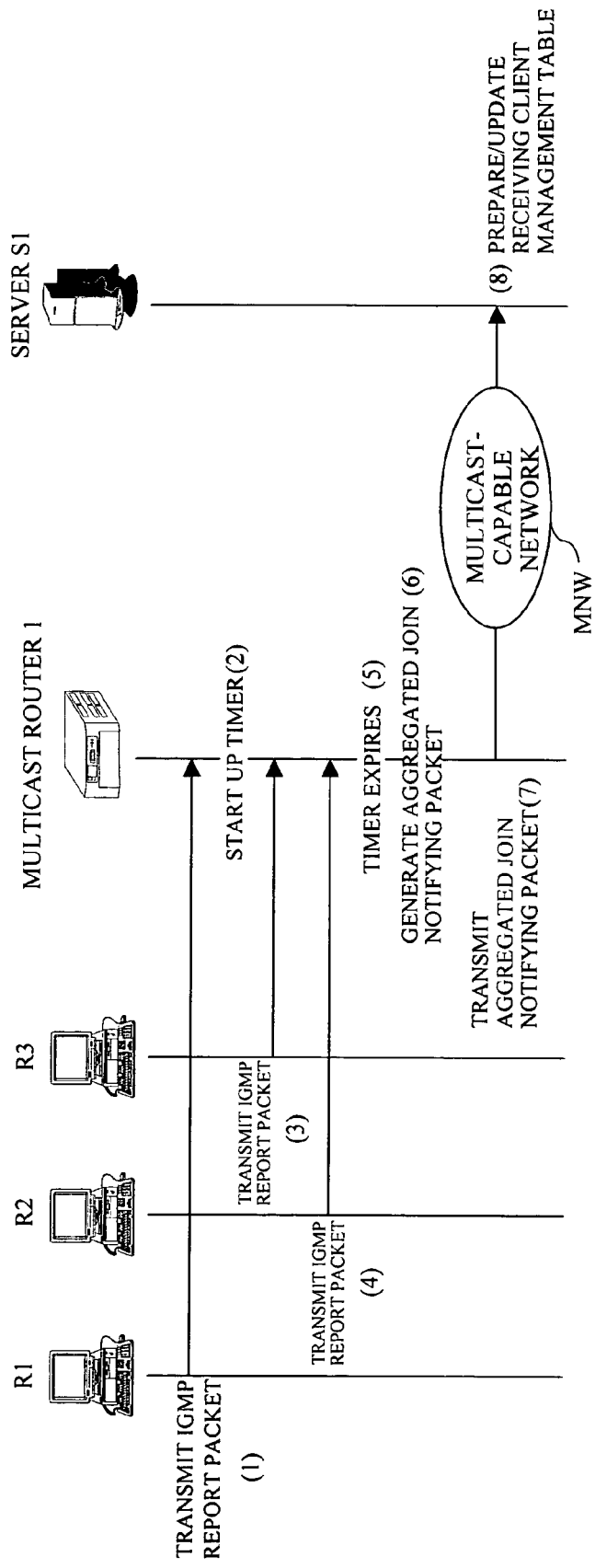
FIGS. 10A and 10B are diagrams showing a multicast aggregated join notifying sequence to a server and a receiving client management table.

FIG. 10A shows a schematic operation sequence among the clients R1-R3, the multicast router 1 and the server S1.

When the IGMP report packet is transmitted from the client R1 (see (1) in FIG. 10A), the multicast router 1 having received the packet starts up the timer 10 (see (2) in FIG. 10A). After that, when the similar packets are received from the clients R3 and R2 (see (3) and (4) in FIG. 10A), the aggregated join notifying packet is generated (see (6) in FIG. 10A) on the condition that the timer 10 has expired (see (5) in FIG. 10A), and the packet is transmitted to the server S1 (see (7) in FIG. 10A). The server S1 prepares the management table of the client in response to the packet (see (8) in FIG. 10A).

FIG. 10B shows an example of an information table held by the server S1 at this time. It is to be noted that "xx" and "tx" in FIG. 10B indicate a state in which a status concerning other multicasts and clients is possessed.

Embodiment [3]

Figure 11:
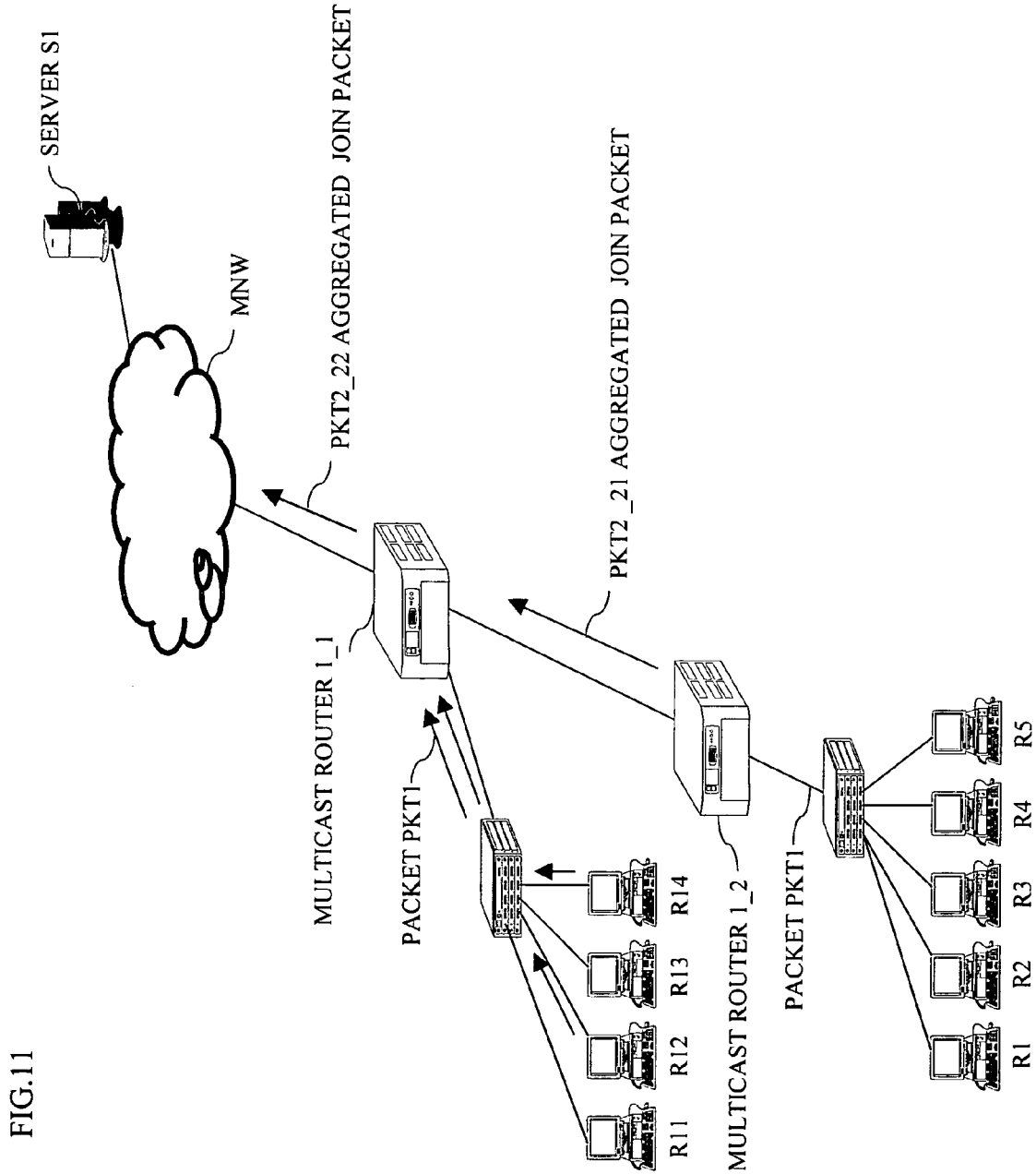
FIG. 11 is a diagram showing an aggregated network example of a multicast aggregated join notifying packet from a downstream direction and a multicast join desiring message information.

As shown in FIG. 11, when an aggregated join notifying message PKT2_21 is transmitted to the server S1 from a certain network relaying device 1_2, the message is received by the network relaying device 1_1 at the subsequent stage in the direction of server. The network relaying device 1_1 examines the packet PKT2_21. When the packet is the aggregated join notifying message, it is further transferred in the direction of server S1.

There is a possibility that the network relaying device 1_1 also has the receiving client on a local interface at this time in the same way as the network relaying device 1_2.

If the network relaying device 1_1 receives the join desiring message concerning multicast data G1 from receiving clients R11-R14, and receives the aggregated join notifying packet PKT2_21 concerning the multicast data G1 from the network relaying device 1_2 in a state where the timer 10 is operated for collecting information, the network relaying device 1_1 cancels the timer 10 in order to avoid delaying the information of the network relaying device 1_2 and being delivered to the server S1. Also, the network relaying device 1_1 generates a packet PKT2_22 in which the information of the local receiving clients R11-R14 which the network relaying device 1_1 has held for the multicast data G1 is added to the received aggregated join notifying packet PKT2_21, and immediately transmits the packet PKT2_22.

Figure 12:
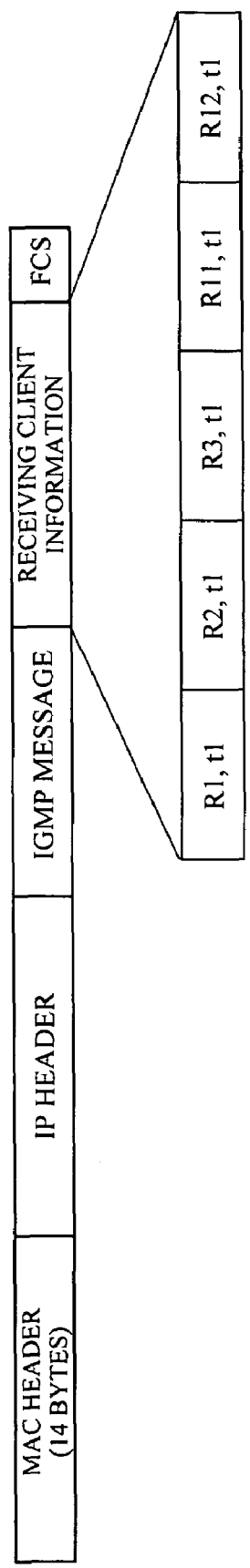
FIG. 12 is a format diagram of a multicast aggregated join notifying packet to which information is added on the way to a server.

FIG. 12 shows a format of the aggregated join notifying packet PKT2_22 transmitted from the network relaying device 1_1.

If the IGMP report is not received from the local receiving clients R11-R14 before the network relaying device 1_1 receives the aggregated join notifying packet PKT2_21 from the network relaying device 1_2, the network relaying device 1_1 transfers the packet to the interface in the direction of server as it is. Also, the operation is independently performed for every multicast address.

FIG. 13A shows a sequence at this time. When the network relaying device 1_1 receives the multicast join packet from the client R11 (see (1) in FIG. 13A), the timer is started up (see (2) in FIG. 13A). Furthermore, when the network relaying device 1_1 receives the aggregated join notifying packet from the network relaying device 1_2 (see (4) in FIG. 13A) after receiving the multicast join packet from the client R12 (see (3) in FIG. 13A), the timer is compulsorily ended (see (5) in FIG. 13A), and the aggregated join notifying packet PKT2_21 from the network relaying device 1_2 to which join information from the clients R11 and R12 is added is immediately transmitted (see (6) in FIG. 13A). The server S1 prepares the table upon receiving the packet (see (7) in FIG. 13A).

FIG. 13B shows an example of a table managed by the server S1 at this time.

Embodiment of Server

Figure 14:
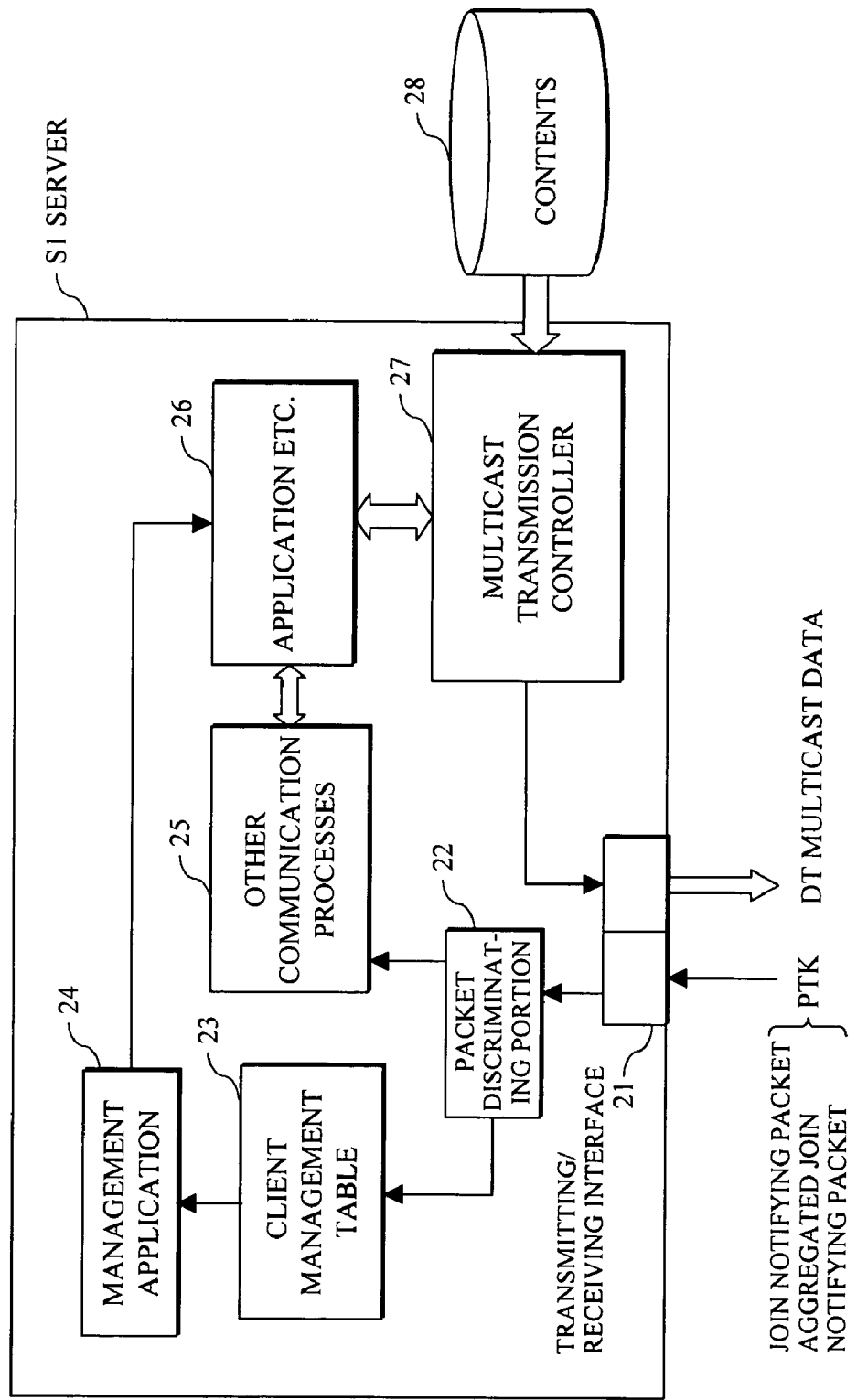
FIG. 14 is a block diagram showing an embodiment of a server (serving as client management server and multicast data transmitting server)

As shown in FIG. 14, the server also has a packet discriminating portion 22 for examining/identifying a user information packet. When the packet is the user information packet, client information, a status, and a reception starting time e.g. per minute are recorded in a client management table 23.

Based on the information, a management application 24 can grasp the number of users and information for calculating a charge in accordance with time. Also, when the number of users is large, the information can be made reference information for designing a server site such as an addition of a server having e.g. the same contents.

The example of FIG. 14 shows a case where the server also performs a receiver management and also a transmission of the multicast data. Also, a communication process 25 and an application 26 drive a multicast transmission controller 27, and perform a function of transmitting the multicast data DT from the contents 28 to the multicast-capable network through a transmitting/receiving interface 21.

Packet Modification

Furthermore, for the multicast join notifying packet and the aggregated join notifying packet, as shown in FIGS. 9 and 12, a method of using the IGMP report received from the client for a necessary information transmission may be adopted, or the packets may be IP packets having an original format.

For example, as shown in FIG. 15, multicast data address information may be included in a payload portion for a data link layer header (e.g. MAC header) and an IP header. At this time, if there is a method of identifying that the packet is the join notifying packet or the aggregated join notifying packet, it is enough. For example, as shown in FIG. 16, a presently not specified value is used for the protocol ID of the IP header, and by confirming the value, the packet can be identified.

It is to be noted that since a well-known protocol ID is managed by IANA (Internet Assigned Numbers Authority) or ICANN (The Internet Corporation for Assigned Names and Numbers), the protocol ID can be used for an actual operation if a protocol ID for message is applied.

Embodiment [4]

When the receiving client stops the reception of the multicast data, a normal leave desiring message (packet), i.e. "IGMP Leave" is transmitted. In the IGMPv2, the IGMP leave message is used, and in the IGMPv3, the IGMP report (transmitted to "224.0.0.22" indicating ALL-IGMPv3 router) in which the multicast address desiring reception is made "empty" is used.

In order to manage the receiving client, information "which client has stopped the reception and when the reception has been stopped" is also managed by the server. It is to be noted that the leave information is basically the same as the case of join information mentioned above.

The example of IGMPv2 will now be described.

The leave message transmitted by the client which has received the multicast data is transmitted to "224.0.0.2"

which is "All-Routers-Group address" (It is to be noted that the IGMP report of the IGMPv3 in which a multicast address desiring a reception is made "empty" is transmitted to "224.0.0.22").

The network relaying device 1 having received the leave message examines whether or not the message is the IGMP leave message by the packet discriminating portion 3. The identification method of the IGMP leave message is firstly to confirm ① IP address is "224.0.0.2", ② the "protocol No." within the IP header is "2" indicating the IGMP, and ③ the type value of the IGMP message is "0x17".

A multicast address which a receiving client desires to leave is similarly stored in the IGMP leave message. In order to inform to the server S1 that the transmitting source client of the message desires to stop the reception of the multicast data which have been received, the packet generator 4 generates a leave notifying packet which has the address of the server S1 as a destination address, and the transfer processor 5 transfers the packet to the server S1 by general routing processing.

Figure 17:
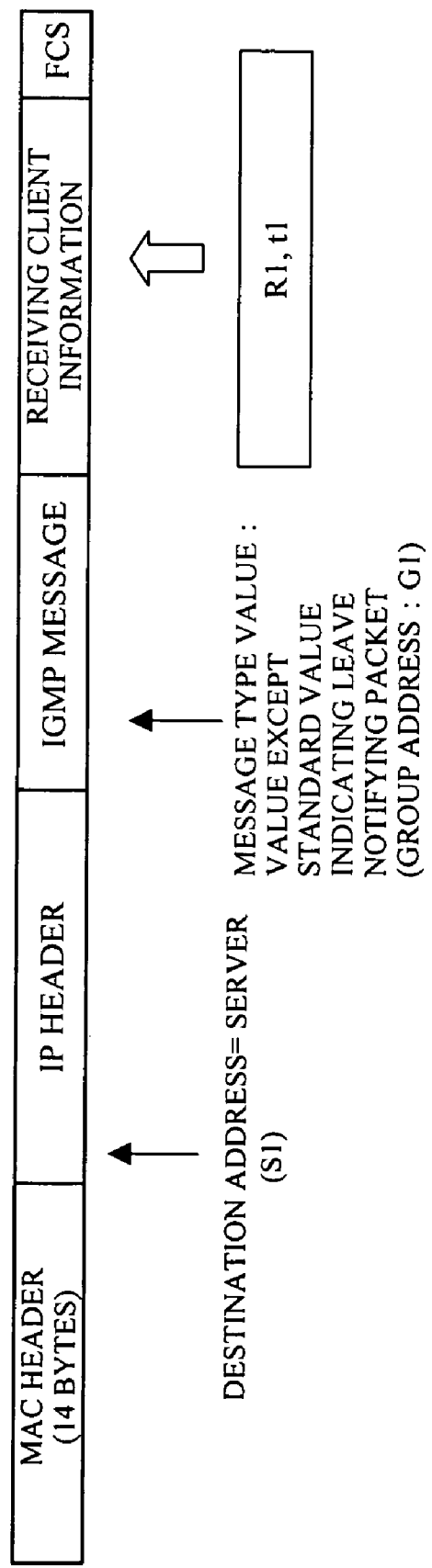
FIG. 17 is a format diagram of a multicast leave notifying packet.

At this time, the type value of the IGMP message is changed and transmitted so that the server S1 can identify the leave notifying message when receiving the packet. FIG. 17 shows a format example of such a leave notifying packet.

The server S1 having received the packet confirms the message type. When it is the leave notifying packet, the address of the client R1 stored in the source address field is associated with the address G1 of the multicast data transmitted by the server S1, and a reception time t2 of the leave notifying packet is added to the packet, thereby enabling which multicast data reception (G1 in this example) was stopped and when the reception was stopped (t2 in this example) to be managed.

Furthermore, as for the client R1, the server S1 holds information that the client R1 started the data transmission to the multicast address G1 at the time t1 (i.e. "R1, G1 and t1"), as mentioned above. By associating the information with the leave starting time t2, a time when the client R1 has received data, "t2−t1" can be calculated. Namely, it is indicated that the client R1 has received the multicast data G1 for the time (t2−t1).

Figures 18A, 18B:
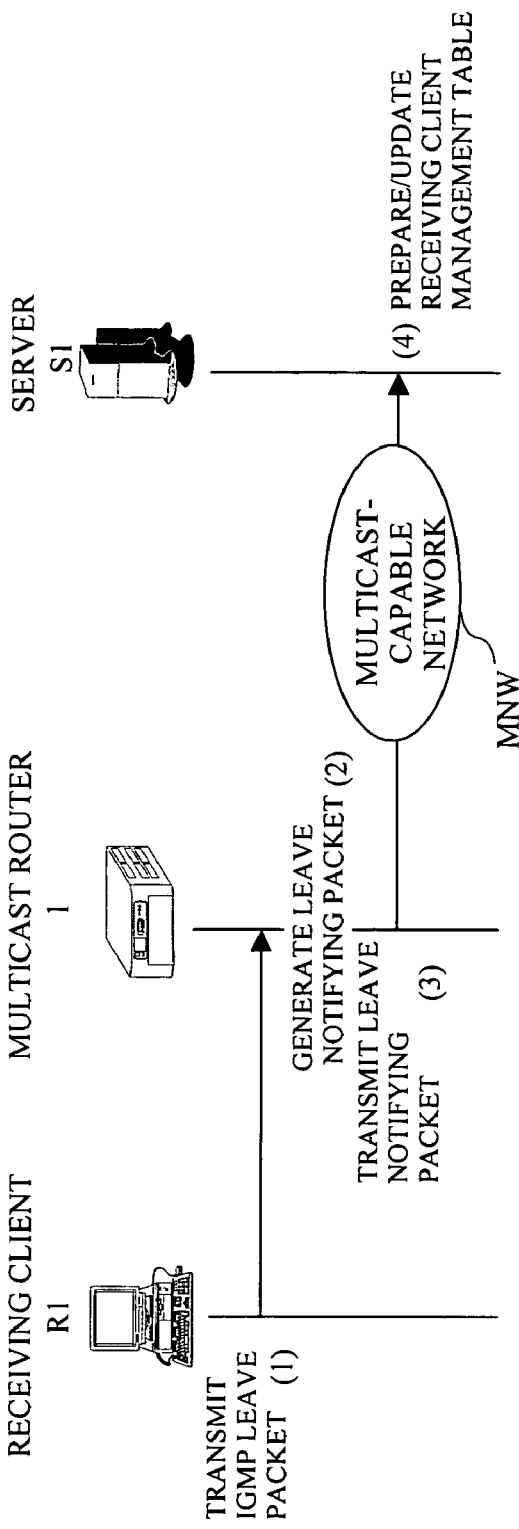
FIGS. 18A and 18B are diagrams showing a multicast leave notifying sequence to a server and a receiving client management table.

Thus, the sequence is the same as the case of the above-mentioned IGMP report. FIG. 18A shows procedures (1)-(4) in the same way as FIG. 7A. Also, FIG. 18B shows an example of a table managed by the server S1. As shown in FIG. 18B, leaving time information and time information indicating a reception time are added.

Embodiment [5]

As a matter of course, as shown in FIG. 5, the network relaying device 1 has a plurality of interfaces 2, 7 and 8. The subnet is connected to each of the interfaces, and numerous clients are connected to each subnet as shown in FIG. 8. When the object network scale is large, numerous leave notifying messages are transmitted to the server. When they are transmitted in a concentrated manner, there is a possibility that the processing load is imposed to the server S1.

Therefore, in the same way as the case of the multicast join information, such a method is considered that the leave information of the subordinate receiving clients is aggregated in each network relaying device 1, and information of a plurality of clients is included in a single packet to be transmitted collectively.

For example, the network relaying device 1 operates the timer 10 when the leave message i.e. the IGMP leave message for the multicast address G1 is firstly received.

The information of all of the IGMP leave messages i.e. the source addresses of the receiving clients received until the timer 10 expires are included in the client information of a single packet as shown in the packet format of FIG. 17, and it is transmitted to the server as the multicast aggregated leave notifying message.

As a determination method of the timer value, when e.g. a server, or an administrator who transmits multicast data desires to manage information per one minute for the purpose of charging, the timer value may be set with 60 sec. After the timer expires, the timer 10 is started up when the IGMP leave message is received again.

Also, at this time, in order to indicate that the multicast aggregated leave notifying message is different from a general IGMP leave message and the above-mentioned leave notifying message, an IGMP type value not specified by the standard and different from those of the above-mentioned join notifying message, aggregated join notifying message, and the above-mentioned leave notifying message may be used in the type field of the IGMP leave message.

Furthermore, since the "maximum response time field" of the IGMP message shown in FIG. 29 is unnecessary in the processing, the method of setting "0" in the "maximum response time field" or the like can be considered. Also, as for the "check sum", it is desirable to set a newly calculated value for the integrity of data.

By including, in a group address field, the multicast address G1 of which reception the client requests to stop, when e.g. the same client receives a plurality of different multicast addresses and desires to stop the reception of the addresses, the addresses can be distinctively managed.

FIG. 19 shows a format example of the aggregated leave notifying packet in which information in a case where three receiving clients R1-R3 leave the multicast group G1 almost at the same time is included.

Also, FIG. 20 shows the client management table 23 when the server S1 receives the aggregated leave notifying packet.

Embodiment [6]

Figure 13:
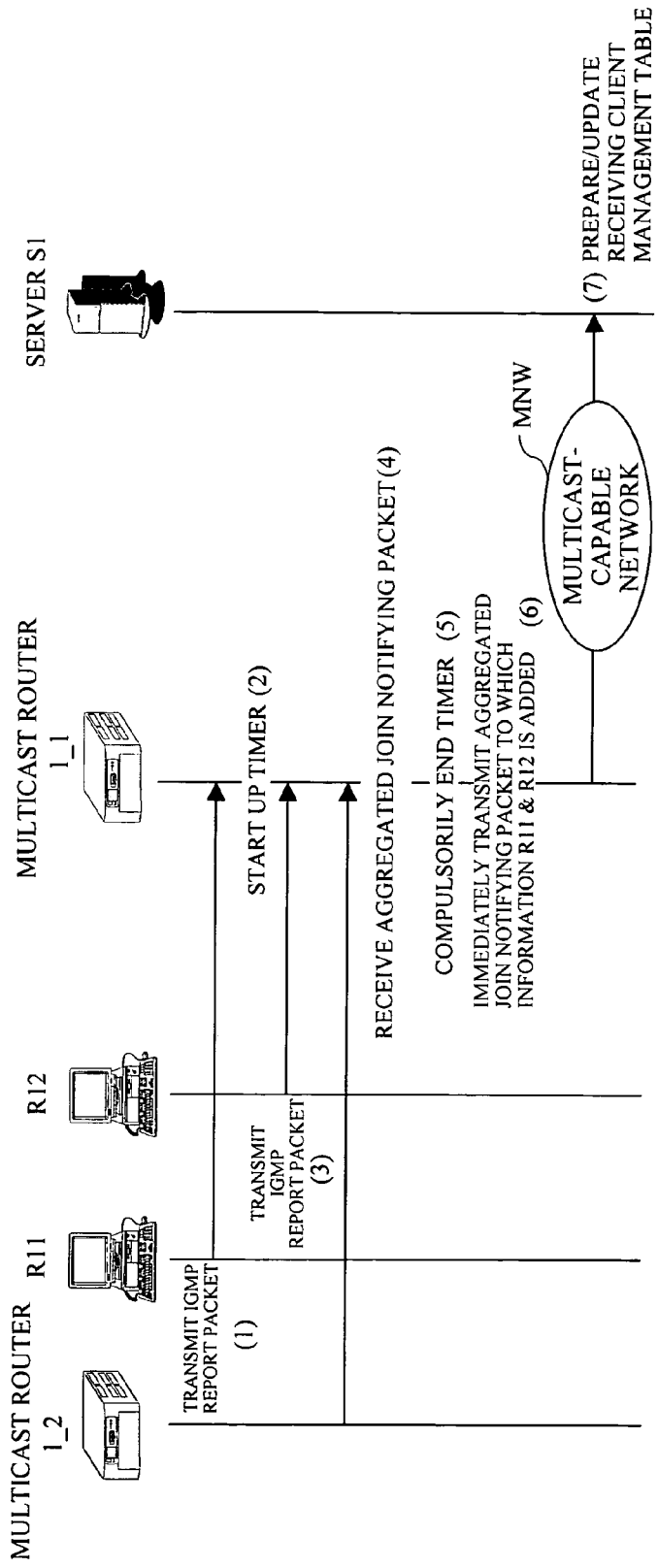
FIGS. 13A and 13B are diagrams showing an information addition sequence to a multicast aggregated join notifying packet and a receiving client management table.

In the same way as the IGMP report packet shown in FIGS. 11 and 13, the aggregated leave notifying message is also received by the subsequent network relaying device 1_1 in the direction of server after it is transmitted from the network relaying device 1_2 to the server S1. The network relaying device 1_1 examines the packet, and when it is the aggregated leave notifying message, it is further transferred in the direction of server.

At this time, there is a possibility that the network relaying device 1_1 also has receiving clients on the local interface in the same way as the network relaying device 1_2.

It is supposed that the network relaying device 1_1 receives the IGMP leave message concerning the multicast G1 from the receiving clients R11-R14, and receives the aggregated join notifying packet concerning the multicast data G1 from the network relaying device 1_2 with the timer 10 being operated for aggregating information.

At this time, in order to avoid delaying the information of the network relaying device 1_2 and being delivered to the server S1, the timer 10 is cancelled, and the information of the local receiving clients R11-R14 which the network relaying device 1_1 has held for the multicast data G1 is added to the received aggregated join notifying packet to be immediately transmitted.

If the network relaying device 1_1 has not received the leave desiring message from the local receiving clients R11-R14 before receiving the aggregated join notifying packet from the network relaying device 1_2, the packet is transferred as it is to the interface in the direction of server. Also, this operation is performed independently for every multicast address.

This operation in FIG. 11 is as follows: When the network relaying device 1_1 receives the leave desiring message from directly connected clients such as clients R11-R14 and the timer 10 is started up for aggregating the information, the network relaying device 1_2 transmits the aggregated leave notifying packet in the direction of server. The timer 10 is stopped when the packet is received at the network relaying device 1_1. The information of the clients R11-R14 is further added to the aggregated leave notifying packet from the network relaying device 1_2 to be immediately transferred to the server S1.

FIG. 21 shows a format example of the aggregated leave notifying packet transmitted from the network relaying device 1_1 in this case. Also, FIG. 22 shows a state of the client management table 23 of the server S1 when the aggregated leave notifying packet is received.

Client Identifying Information

The receiving client management in the multicast data distribution has been described above. The identification of each client by the IP address of the client is the most convenient. Namely, the IGMP report packet transmitted from a user, or the IP address of the source address of the IGMP leave packet can be used.

Since an IP address is assigned to a personal computer in a user's house from an ISP (Internet Service Provider) with which the user establishes an account in case of e.g. a dial-up user, the IP address is used. On the other hand, in a broadband access such as FTTH (Fiber to the Home) and ADSL (Asymmetric Digital Subscriber Line), an address is assigned to an outward interface of a compact router (SOHO (Small Office Home Office) router) within the user's house, so that it can be used.

The address assignment of the ISP is performed, as a matter of course for charging management, with information "to which user the IP address is assigned, which IP address is assigned, and how long (from when until when) the IP address has been assigned". Accordingly, if this information, the IP address information of the receiving client of the multicast and the reception time (t2–t1) are combined, a charge calculation in accordance with time of the multicast contents is made possible.

Figure 28A:
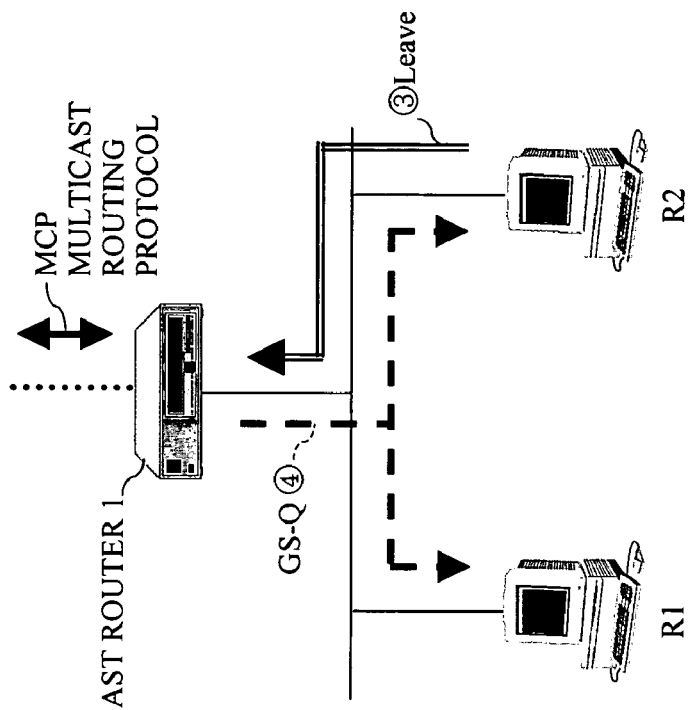
FIGS. 28A and 28B are diagrams for illustrating a general multicast join/leave procedure of an IGMP.
Figure 28B:
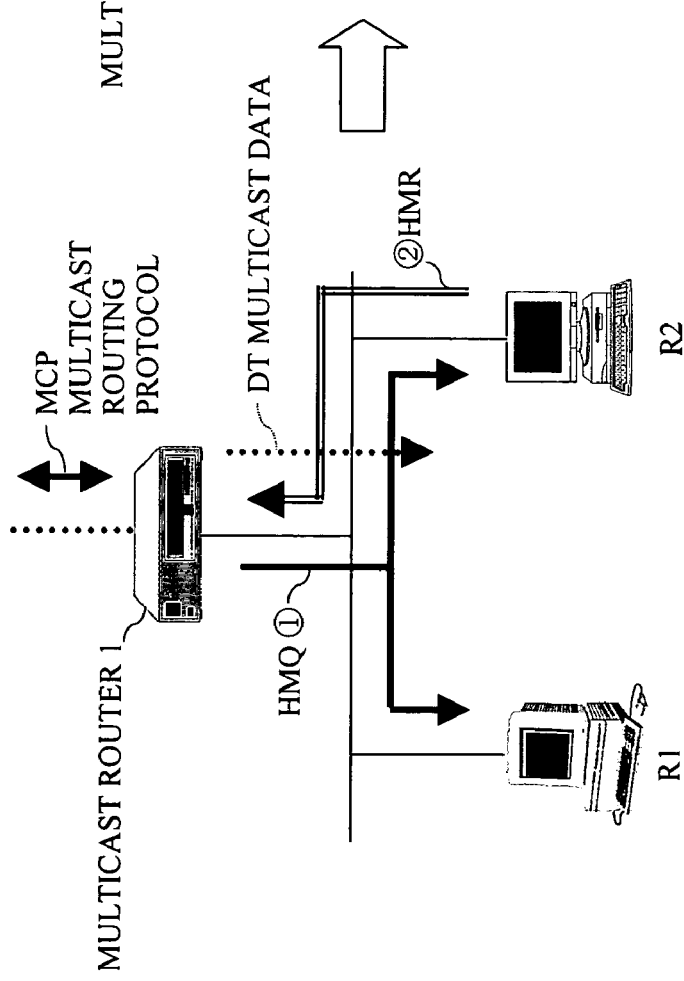

When an SOHO router exists in the user's house, and a plurality of terminals exist within the router to receive the same multicast, if one terminal transmits a leave message, i.e. the IGMP leave message, the network relaying device (multicast router) receives the message. Then, the network relaying device transmits a "GS-Q (Group Specific Query)" message described in FIG. 28B in order to confirm whether or not other clients which desire to receive the multicast data exist under the subordinate of the interface.

Since the other client within the user's house having received the message through the SOHO router newly transmits the join desiring message in order to indicate the desire of a continuous reception, the same address, i.e. the address assigned to the SOHO router remains as the information of the receiving client, so that it does not occur that the reception becomes disabled. Namely, in the present Internet access form, and an broadband access environment such as ADSL and FTTH which is expected to be increased in the future, the operation can be performed without problems.

Collective Transmission of Management Information

The method and device for managing the receiving client by transferring the join/leave information of the client to the server based on the IGMP join/leave message transmitted by the client have been described.

Different from the above-mentioned description, a method of holding/accumulating the client information of the network relaying device which generally accommodates a plurality of clients, and of collectively transmitting the information to a management server upon necessity of the management information as a trigger can be considered. In this case, the processing load of the client management on the server side can be reduced.

In a network form accommodating an end user in a general intranet or in the Internet access, as shown in FIG. 1, the receiving clients R1 and R2 are accommodated in the LAN switches/layer 2 switches SW1 and SW2, and are further connected to the upper network relaying device (multicast).

At this time, each network relaying device holds, by the above-mentioned means, the information of the subordinate receiving client of the respective interface and information of which multicast address the data are addressed, and from when until when the data have been received.

Namely, by the reception of the IGMP report, the IP address of the receiving client, the multicast address G1 requested and the join time t1 are recorded.

When the IGMP leave message is received from the same receiving client, the time t2 of receiving the IGMP leave message is added to the client address information. If this operation is performed for every multicast at each interface, the information required for the management can be acquired.

The management information which each network relaying device has collected for the respective local subnet connected to its own network relaying device is not immediately transmitted in the direction of server, but the information of the receiving client held is collectively transmitted to a carrier composing a network and a management server such as an ISP which provides service upon e.g. the end of a multicast session as a trigger.

Alternatively, when the multicast session ends, the information concerning the multicast may be transmitted or it may be transmitted by a command from a server.

Thus, when the information of the receiving client is not required to be grasped at the server in real time, the information is collectively transmitted at a certain time after the end of the multicast data transmission, thereby making the operation and the management on the server side simple. As a matter of course, such information can be used for a purpose of a charge calculation in accordance with time per user and the examination of the number of receiving users (audience rating).

The above-mentioned local user information holding function may be provided in the LAN switches SW1 and SW2 referring to FIG. 1, or may be provided in the multicast routers 1_1 and 1_2.

Setting of IGMP Type Value

One embodiment of the present invention has been described in the above. As for the IGMP type value identifying the join notifying packet, the aggregated join notifying packet, the leave notifying packet and the aggregated leave notifying packet respectively, a value not used in the standard shown in FIG. 29 may be used as follows for example:

Join notifying packet: 0x31
Aggregated join notifying packet: 0x32
Leave notifying packet: 0x33
Aggregated leave notifying packet: 0x34

Also, the present invention can be applied to the IPv6 multicast. A main difference between the IPv6 multicast and the IPv4 multicast will now be described.

(1) The multicast MAC address is generated by mapping lower 32 bits of 128-bit IPv6 address to 48-bit MAC address 33: 33: xx: xx: xx: xx.

Figure 23:
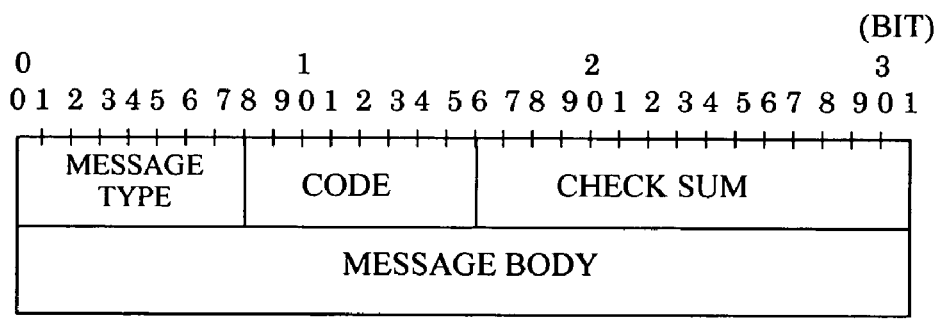
FIG. 23 is a general format diagram of an ICMPv6 message.
Figure 24:
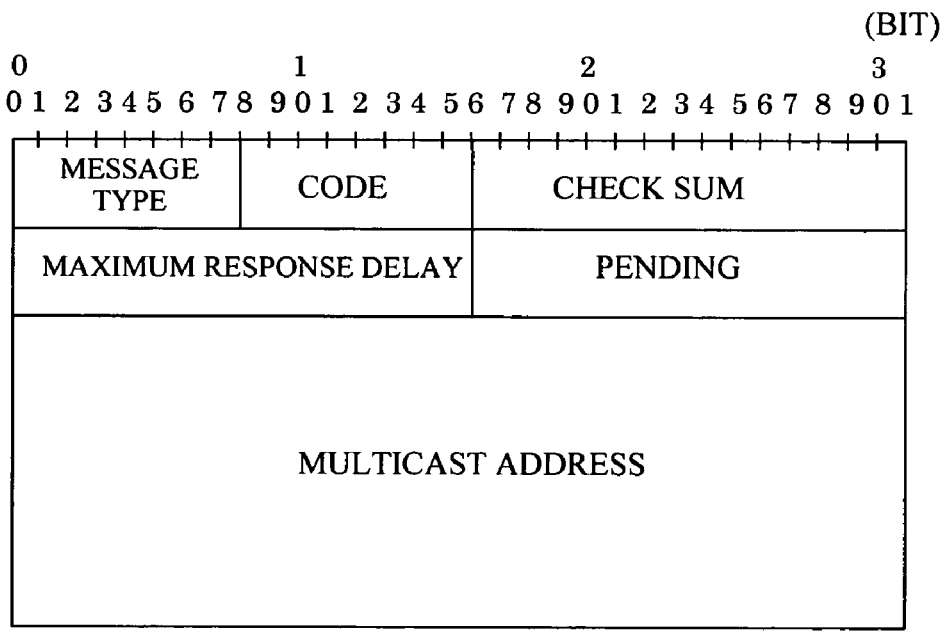
FIG. 24 is a general format diagram of an MLD message.

(2) As for the MLD corresponding to the IGMP of the IPv4, an ICMPv6 message (specified in RFC 2463) shown in FIG. 23 is used. The type value "130" of the ICMPv6 is a query message of the IGMP, "131" is the IGMP report, "132" is a Done (same as the IGMP leave). (see FIG. 24).

(3) An IPv6 multicast address is identified by an FF0X: 0: 0: 0: 0: 0: 0:0 (head 8 bits is 11111111).

Namely, by taking steps in consideration of the above-mentioned difference, the method of the present invention can be applied to the multicast in the IPv6 environment.

Embodiment [7]

By the above-mentioned method, the management of the receiving client is made possible. However, when the reception can not be performed due to an OS fault of the client and a hung-up of a media reproduction application or the like, the leave message, i.e. the IGMP leave message can not be transmitted. In this case, an accurate leave management of the client can not be performed. The embodiment for solving this problem will now be described.

Generally, the multicast router periodically transmits (default 125 sec.) the IGMP query message to "224.0.0.1" which is an "All-Systems Group" address, so that the client during reception receives the query message and transmits the IGMP report.

The above-mentioned IGMP report is voluntarily transmitted by the client upon determining the reception of the multicast data in many cases, and is transmitted in response to the IGMP query message periodically transmitted from the network relaying device in a few cases. However, by the IGMP report transmitted in response to the IGMP query message periodically transmitted, client's living is periodically monitored. This is an operation specified by a general standard.

If a certain receiving client can not receive due to an OS fault, hung-up of a media reproduction application or the like, the receiving client does not respond to the IGMP query message periodically transmitted from the network relay, and does not transmit the IGMP report.

The network relaying device regards the receiving client which does not respond to the IGMP query message as a reception stop, fills in a leaving time in the client management table of its own device, fills in "reception stop/error" in the status, generates the leave notifying message for client to be transmitted to the server S1, thereby enabling a client management corresponding to a fault to be performed.

In this case, as mentioned above, the information is written by the IGMP report which the client has voluntarily transmitted upon determining the reception of the multicast data in many cases. However, operation of confirming living is performed by the reception of the IGMP report in response to the IGMP query message periodically transmitted.

When the client management is performed per minute accurately, the timer of the query message periodically transmitted may be set with the default 125 sec. to 60 sec. to be operated. In a case where the timer is set with ten minutes, the default value is sufficient.

If the client starts the reception, the starting time and the leaving time afterward may be reflected in the management table.

Also, when the network relaying device holds the management table, the information may be reflected in the management table of the network relay, and may be collectively transmitted to the server with a certain trigger.

Alternatively, as another means, there is a method of confirming living of the receiving client by Ping.

Figure 25:
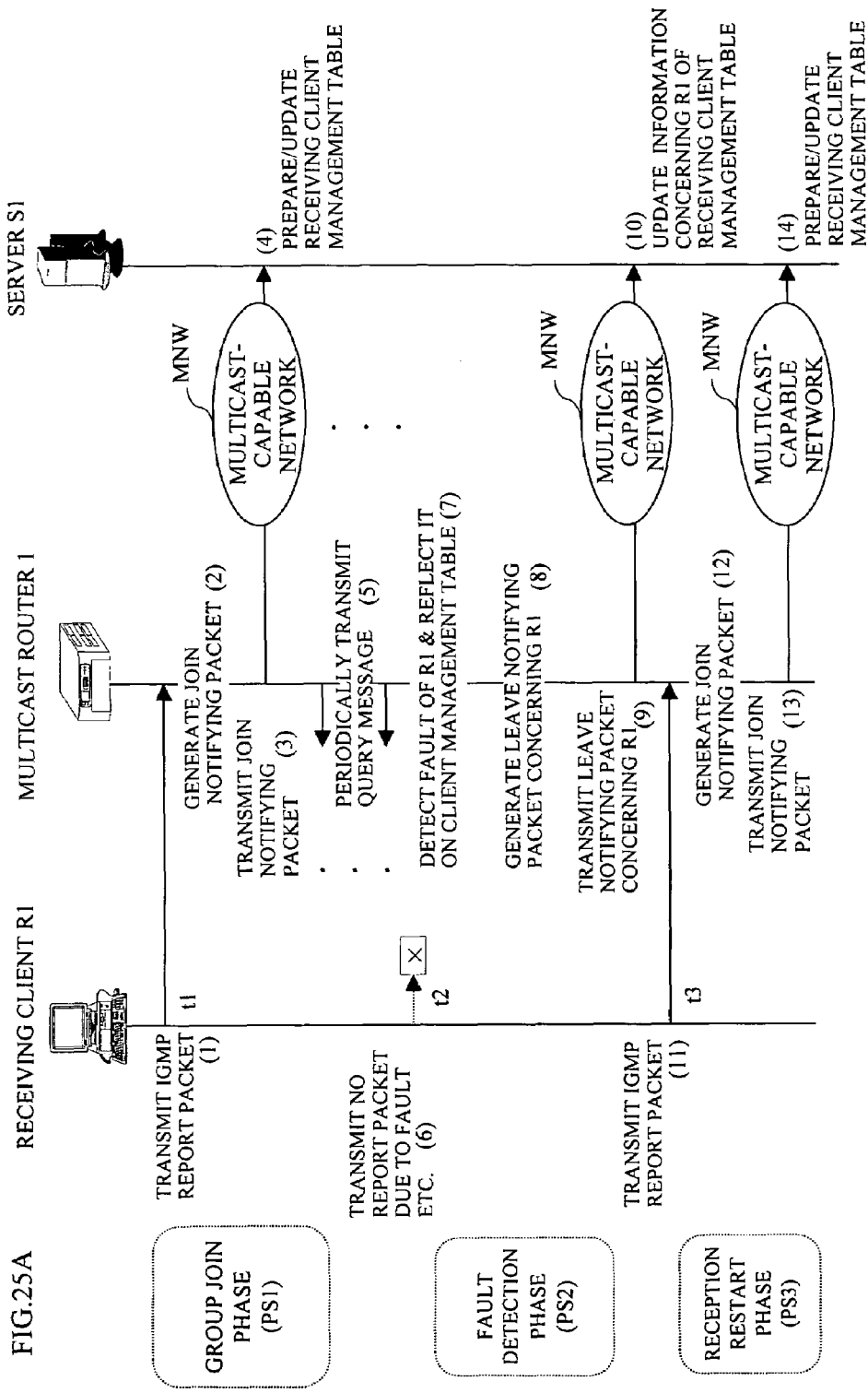
FIGS. 25A and 25B are diagrams showing a summary of a detection of a client fault, a server notification, and a management table update.

FIGS. 25A and 25B show the summary.

Namely, FIG. 25A is divided into 3 phases PS1-PS3. In the phase PS1, for a group join, the client R1 transmits the IGMP report (see (1) in FIG. 25A), the multicast router 1 generates the join notifying packet (see (2) in FIG. 25A) and transmits the packet to the server S1 through the multicast-capable network MNW (see (3) in FIG. 25A). The server S1 prepares the client management table 23 from the packet (see (4) in FIG. 25A).

The phase PS2 indicates a fault detection phase. When the multicast router 1 periodically transmits the query message (see (5) in FIG. 25A), the client R1 can not transmit the IGMP report to the query if the client R1 is supposed to be in a fault state (see (6) in FIG. 25A).

Thus, the multicast router 1 detects that the client R1 is in the fault state, and fills in the state in its own client management table (see (7) in FIG. 25A). Then, the multicast router 1 generates the leave notifying packet concerning the client R1 (see (8) in FIG. 25A) to be transmitted to the server S1 (see (9) in FIG. 25A). The server S1 updates the management information concerning the client R1 (see (10) FIG. 25A).

The phase PS3 indicates a reception restart phase. The client R1 transmits the IGMP report packet after the fault recovery (see (11) in FIG. 25A). In response to the packet, the multicast router 1 generates the join notifying packet (see (12) in FIG. 25A) to be transmitted to the server S1 (see (13) in FIG. 25A). The server S1 updates the client management table (see (14) in FIG. 25A).

As a result, the information concerning the client R1 within the client management table 23 in the server S1 includes the information of the time t3 at which the reception is started, which is as shown in FIG. 25B.

Charging Service in Accordance with Time

The receiving client management system in the server has been described in the above. New service can be provided by using this mechanism.

As mentioned above, in the distribution of data such as voices and images by the multicast, information of what receiving clients exist, how many receiving clients totally exist at a certain time, how many receiving clients have totally received the multicast data could not be grasped.

This is because the mechanism of the multicast does not have such a concept originally, and a UDP packet is used for the data transmission. Such a background prevents the multicast having numerous advantages at the same time from being widespread.

Therefore, the network relaying method and device provided by the present invention enable a user management service in the multicast data distribution and charging service in accordance with time for a content usage per receiving client which has been impossible in the prior art.

In the present service form of a chargeable content distribution (by unicast), following two forms are mainly provided. One is a form of purchasing a right of a service usage by a fixed fee, and the other is a pay-as-you-go form. Also, these are all unicast, and a distribution form is on-demand or real-time broadcasting.

At this time, as for the real-time broadcasting especially, it has been already described that the multicast is effective in terms of cutting down new plant and equipment. However, if services are provided since the multicast can not manage the user itself, there has been no other method except purchasing the right of a content access. Also, as for the multicast, not an on-demand distribution but a real-time content distribution is performed. Therefore, it has been necessary to make access without fail when the reception is possible.

However, if the receiving client management is performed by the present invention, charging in accordance with the time when the client has accessed can be performed, so that it becomes very easy for a carrier to provide services.

Also, if a user can not access content during a broadcasting time, no charge is required. When a program distributed by accessing is used for a fixed time during the content broadcasting, the charge for that time is required. Thus, services with merits for the user can be provided.

Figure 26:
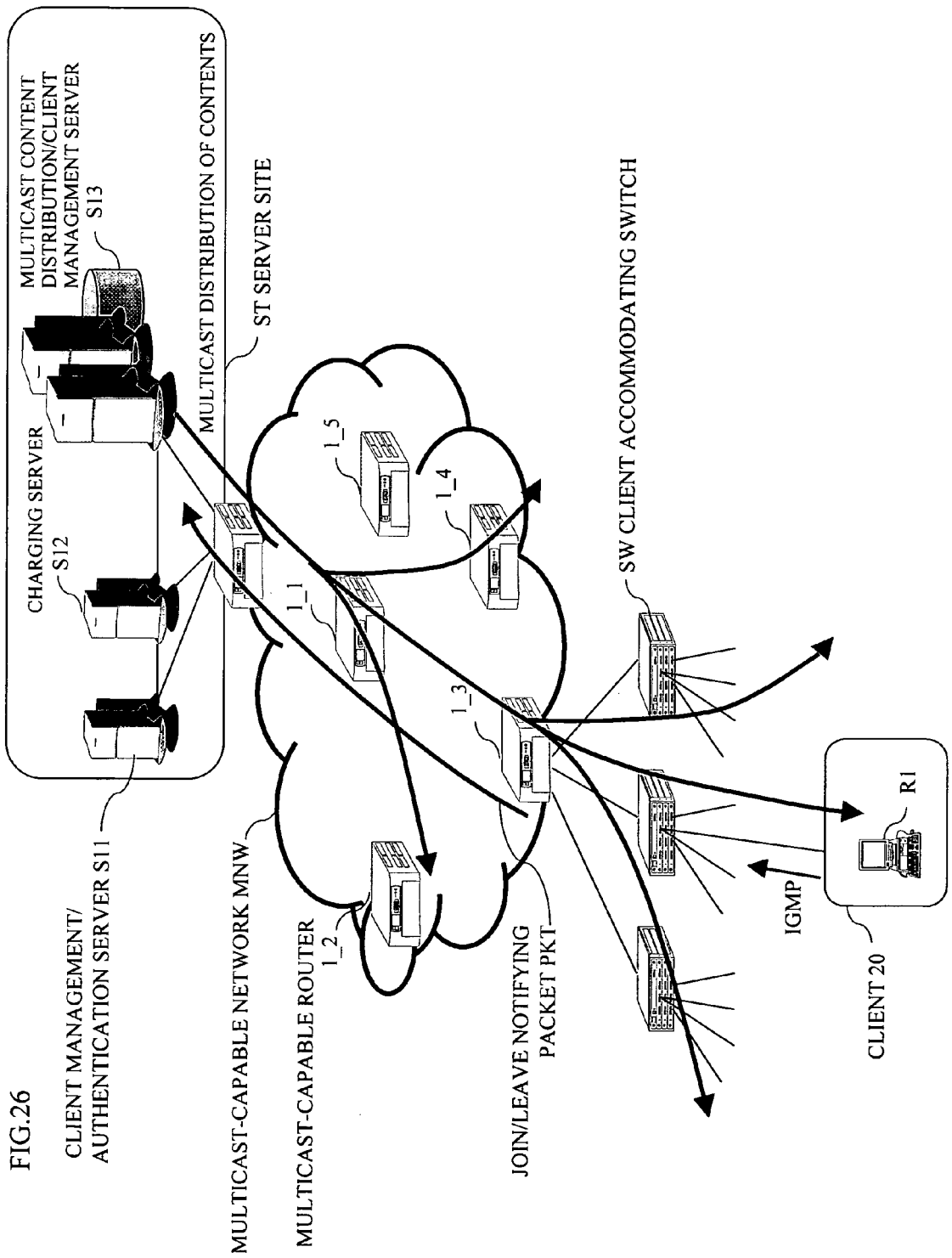
FIG. 26 is a concept diagram of charging service in accordance with time when a multicast content is used.
Figure 27:
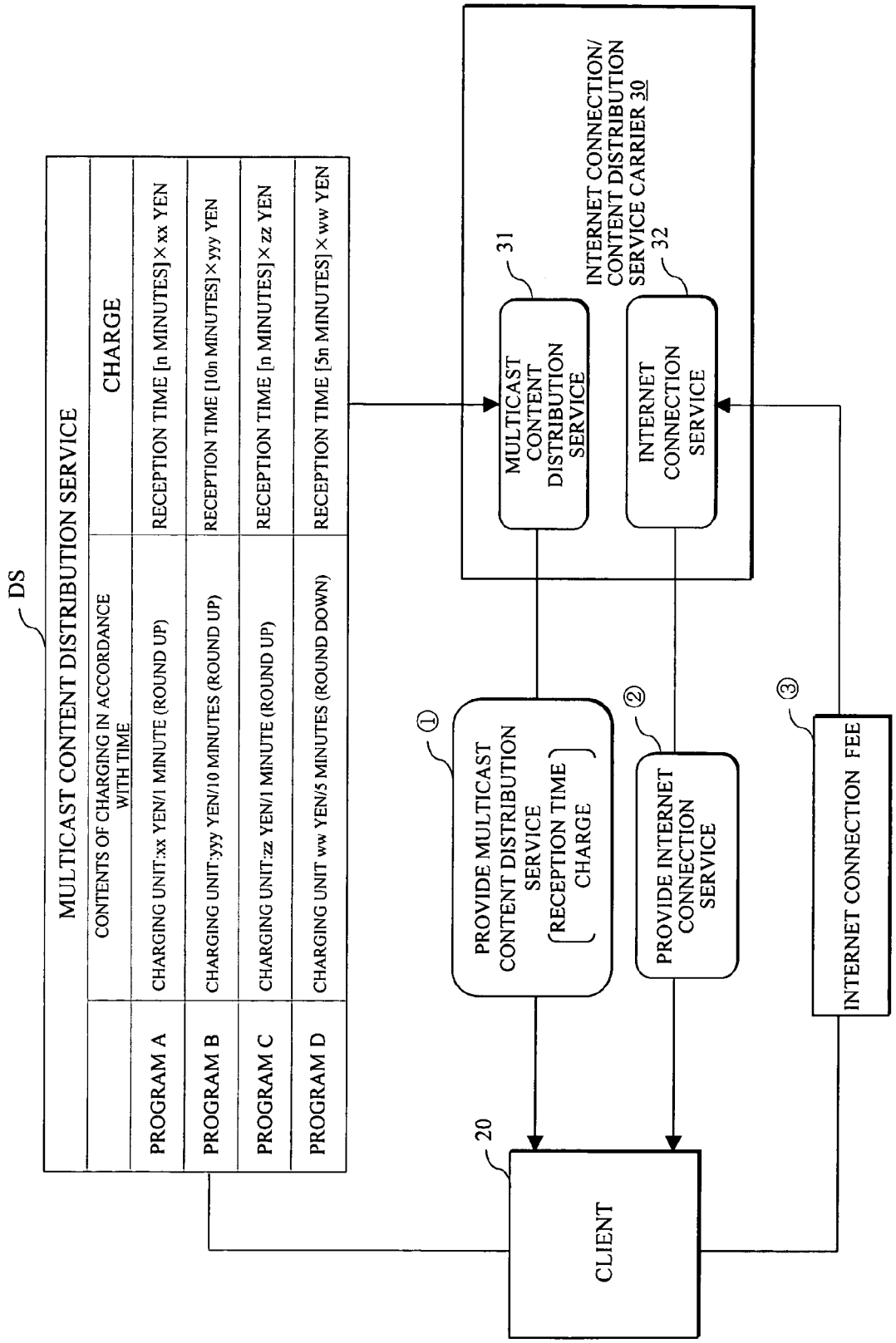
FIG. 27 is a diagram showing an example of multicast content distribution service and a time charging system using the present invention.

FIGS. 26 and 27 show examples of the service provision form.

In the example of FIG. 26, a server site ST such as an ISP/NSP is provided with a client management/authentication server S11, a charging server SR, and a multicast content distribution/client management server S13. The server S13 performs client management/authentication to the multicast join/leave information of the client 20 or the like at the server S11, whereby the server S13 collects the multicast join/leave information through a client accommodating switch SW and multicast-capable routers 1_1-1_5 or the like.

As shown in FIG. 27, an Internet connection/content distribution carrier 30 provides general Internet connection service 32 to the client 20 ②, and charges the client (user) for the Internet connection fee ③. Also, when the Internet connection/content distribution carrier 30 provides the content distribution service to the client 20 ① as a further added value service, multicast content distribution service DS by the pay-as-you-go system for the multicast usage can be provided.

Namely, the content distribution service DS charging in accordance with the program reception time of the client 20 can be provided, and the Internet connection/content distribution carrier 30 charges the program reception fee for the client 20 in accordance with the program reception time of the client 20.

As mentioned above, the present invention enables a receiving user management in the data distribution, which has been difficult, by the multicast in the same way as the present unicast communication, thereby reliability of the multicast communication to be provided. The present invention can contribute to the spread of the multicast-capable network device, the end system, and the multicast-capable application.

Also, the present invention enables the number of receiving clients at a certain time and the number of receivers in total to be grasped and managed by providing a user management function in the multicast environment, and contributes to the spread of the content distribution service and the Internet real-time broadcasting by the multicast.

Furthermore, the present invention can provide charging service in accordance with time in the multicast content distribution which has been impossible, by providing a user management even in the multicast distribution, and contributes to spreads of a content distribution business, and a broadband network for the purpose of a content reception.

What is claimed is:

1. A network relaying method comprising:
a first step of discriminating join/leave information transmitted by a client to a multicast group, wherein the first step discriminates the join/leave information of the client mounted on a multicast control packet from the client;
a second step of processing the join/leave information of the client into multicast join/leave notifying information; and
a third step of transferring the multicast join/leave notifying information to a server with the multicast join/leave notifying packet,
wherein when transferring the multicast join/leave notifying packet to the server and receiving join/leave information for a same multicast group from another client within a fixed time, the second step generates an aggregated join/leave notifying packet in which the join/leave information for all of the clients is aggregated in a single packet and the third step transfers the aggregated join/leave notifying packet to the server,
and wherein when the first step discriminates a reception of the aggregated join/leave notifying packet from a downstream network device, the third step further transfers the aggregated join/leave notifying packet to the server.

2. The network relaying method as claimed in claim 1, wherein the multicast join/leave notifying information includes identifying information of the client, a multicast address and a join/leave starting time.

3. The network relaying method as claimed in claim 1, wherein when the first step discriminates a reception of the multicast join/leave notifying packet from a downstream network device, the third step further transfers the multicast join/leave notifying packet to the server.

4. The network relaying method as claimed in claim 1, wherein the third step holds the join/leave information of the client until a transfer is requested from the server.

5. The network relaying method as claimed in claim 2, wherein a transmitting source address included in a packet is used as identifying information of the client.

6. The network relaying method as claimed in claim 1, wherein when the client does not respond to a periodical query, the third step transmits leave notifying information of the client to the server.

7. A server comprising: a discriminating portion for discriminating multicast join/leave notifying information transmitted from the network relaying device as claimed in claim 6; and a holding portion for extracting information of the client in the multicast join/leave notifying information to be held.

8. The server as claimed in claim 7, further comprising means charging by the hour a multicast data distribution based on the client information.

9. A network relaying method comprising:
a first step of discriminating join/leave information transmitted by a client to a multicast group, wherein the first step discriminates the join/leave information of the client mounted on a multicast control packet from the client;
a second step of processing the join/leave information of the client into multicast join/leave notifying information; and
a third step of transferring the multicast join/leave notifying information to a server with the multicast join/leave notifying packet,
wherein when transferring the multicast join/leave notifying packet to the server and receiving join/leave information for a same multicast group from another client within a fixed time, the second step generates an aggregated join/leave notifying packet in which the join/leave information for all of the clients is aggregated in a single packet and the third step transfers the aggregated join/leave notifying packet to the server, and wherein when the first step discriminates a reception of the aggregated join/leave notifying packet from a downstream network device, the second step generates, when the join/leave information for a same multicast group from the client itself is aggregated, the aggregated join/leave notifying packet in which all of join/leave information is aggregated in the single packet and the third step immediately transfers the aggregated join/leave notifying packet to the server.

10. A network relaying device comprising:
a discriminating portion for discriminating join/leave information transmitted by a client to a multicast group, wherein the discriminating portion discriminates the join/leave information of the client mounted on a multicast control packet from the client;
an information processing portion for processing the join/leave information of the client into multicast join/leave notifying information; and
a transfer processor for transferring the multicast join/leave notifying information to a server with the multicast join/leave notifying packet,
wherein when transferring the multicast join/leave notifying packet to the server and receiving join/leave information for a same multicast group from another client within a fixed time, the information processing portion generates an aggregated join/leave notifying packet in which the join/leave information for all of the clients is aggregated in a single packet and the transfer processor transfers the aggregated join/leave notifying packet to the server,
and wherein when the discriminating portion discriminates a reception of the aggregated join/leave notifying packet from a downstream network device, the transfer processor further transfers the aggregated join/leave notifying packet to the server.

11. The network relaying device as claimed in claim 10, wherein the multicast join/leave notifying information includes identifying information of the client, a multicast address and a join/leave staffing time.

12. The network relaying device as claimed in claim 10, wherein when the discriminating portion discriminates a reception of the multicast join/leave notifying packet from a downstream network device, the transfer processor further transfers the multicast join/leave notifying packet to the server.

13. The network relaying device as claimed in claim 10, wherein the transfer processor holds the join/leave information of the client until a transfer is requested from the server.

14. The network relaying device as claimed in claim 11, wherein a transmitting source address included in a packet is used as identifying information of the client.

15. The network relaying device as claimed in claim 10, wherein when the client does not respond to a periodical query, the transfer processor transmits leave notifying information of the client to the server.

16. A network relaying device comprising:
a discriminating portion for discriminating join/leave information transmitted by a client to a multicast group, wherein the discriminating portion discriminates the join/leave information of the client mounted on a multicast control packet from the client;
an information processing portion for processing the join/leave information of the client into multicast join/leave notifying information; and
a transfer processor for transferring the multicast join/leave notifying information to a server with the multicast join/leave notifying packet,
wherein when transferring the multicast join/leave notifying packet to the server and receiving join/leave information for a same multicast group from another client within a fixed time, the information processing portion generates an aggregated join/leave notifying packet in which the join/leave information for all of the clients is aggregated in a single packet and the transfer processor transfers the aggregated join/leave notifying packet to the server,
and wherein when the discriminating portion discriminates a reception of the aggregated join/leave notifying packet from a downstream network device, the information processing portion generates, when the join/leave information for a same multicast group from the client itself is aggregated, the aggregated join/leave notifying packet in which all of join/leave information is aggregated in the single packet and the transfer processor immediately transfers the aggregated join/leave notifying packet to the server.

* * * * *